US012562062B2

(12) United States Patent
Balasubramanian et al.

(10) Patent No.: US 12,562,062 B2
(45) Date of Patent: Feb. 24, 2026

(54) TECHNIQUES FOR DETECTING VULNERABLE ROAD USERS

(71) Applicant: QUALCOMM Incorporated, San Diego, CA (US)

(72) Inventors: Anantharaman Balasubramanian, San Diego, CA (US); Dan Vassilovski, Del Mar, CA (US); Gene Wesley Marsh, San Diego, CA (US); Shailesh Patil, San Diego, CA (US); Nileshkumar Parekh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 364 days.

(21) Appl. No.: 17/740,930

(22) Filed: May 10, 2022

(65) Prior Publication Data

US 2023/0368670 A1     Nov. 16, 2023

(51) Int. Cl.
*G08G 1/16* (2006.01)
*H04W 4/40* (2018.01)

(52) U.S. Cl.
CPC .............. *G08G 1/166* (2013.01); *H04W 4/40* (2018.02)

(58) Field of Classification Search
None
See application file for complete search history.

(56) References Cited

U.S. PATENT DOCUMENTS 12,063,668 B2 * 8/2024 Kumar .................. H04W 72/51
2014/0309849 A1   10/2014 Ricci

| | | | |
|---|---|---|---|
| 2015/0035685 A1 * | 2/2015 | Strickland .............. | B60Q 9/008 340/901 |
| 2017/0032673 A1 | 2/2017 | Scofield et al. | |
| 2017/0101054 A1 * | 4/2017 | Dusane ............ | G08G 1/096741 |
| 2017/0120803 A1 * | 5/2017 | Kentley ............ | B60W 60/0016 |
| 2017/0208533 A1 * | 7/2017 | Stracener .............. | H04W 48/04 |
| 2018/0061232 A1 * | 3/2018 | Madigan .............. | B60W 40/08 |
| 2018/0126901 A1 * | 5/2018 | Levkova .............. | B60W 40/09 |
| 2018/0281784 A1 * | 10/2018 | Huang .................. | B60W 40/08 |
| 2019/0147273 A1 * | 5/2019 | Hyuga .................. | B60W 40/08 340/425.5 |
| 2019/0188505 A1 * | 6/2019 | Madkor .............. | G08G 1/0141 |
| 2019/0287401 A1 | 9/2019 | Aoude et al. | |

(Continued)

OTHER PUBLICATIONS

International Search Report and Written Opinion—PCT/US2023/063918—ISA/EPO—Jun. 16, 2023 (2202885WO).

*Primary Examiner* — Muhammad Adnan
(74) *Attorney, Agent, or Firm* — Holland & Hart LLP

(57) ABSTRACT

Methods, systems, and devices for wireless communication are described. A first user equipment (UE) may monitor various sensors to obtain data associated with a user of the first UE, and may determine that the user is in a vulnerable state based on monitoring these sensors. The vulnerable state of the user may include an inebriated state, a distracted state, an impaired state, or a disabled state, among other examples. After detecting the vulnerable state of the user, the first UE may transmit a public safety message (PSM) to other devices in the area. Upon receiving the PSM from the UE, a network entity may use positioning information to identify other UEs within a threshold distance of the first UE, and may transmit an alert message to these UEs. The techniques described herein may reduce the probability of nearby pedestrians or vehicles colliding with the user.

27 Claims, 16 Drawing Sheets

(56)         References Cited

U.S. PATENT DOCUMENTS

| | | | |
|---|---|---|---|
| 2020/0229106 A1* | 7/2020 | Nguyen | H04W 52/245 |
| 2020/0274573 A1* | 8/2020 | Marcum | H04M 1/185 |
| 2020/0286310 A1* | 9/2020 | Carver | G07C 5/02 |
| 2020/0394919 A1* | 12/2020 | Ahmad | H04W 4/44 |
| 2020/0402404 A1* | 12/2020 | Balasubramanian | H04W 4/44 |
| 2022/0068120 A1* | 3/2022 | Alfano | G08G 1/166 |
| 2022/0114063 A1* | 4/2022 | Cheraghi | H04L 69/40 |
| 2023/0088324 A1* | 3/2023 | Kumar | H04W 4/46 |
| | | | 370/329 |
| 2024/0101124 A1* | 3/2024 | Iwase | B60W 40/08 |
| 2024/0118364 A1* | 4/2024 | Balasubramanian | G01S 5/0215 |

* cited by examiner

Communications Manager

PSM Receiving Component

625

Receiver

610

UE Identifying Component

630

Transmitter

615

Alert Message Transmitting
Component

635

620

605

600

130

105

115

Network
Entity

Transceiver

810

Antenna

815

Communications
Manager

820

Memory

Code

830

825

840

Processor

835

805

800

Communications Manager

Sensor Monitoring Component

1025

Receiver

1010

State Determining Component

1030

Transmitter

1015

PSM Transmitting Component

1035

1020

1005

1000

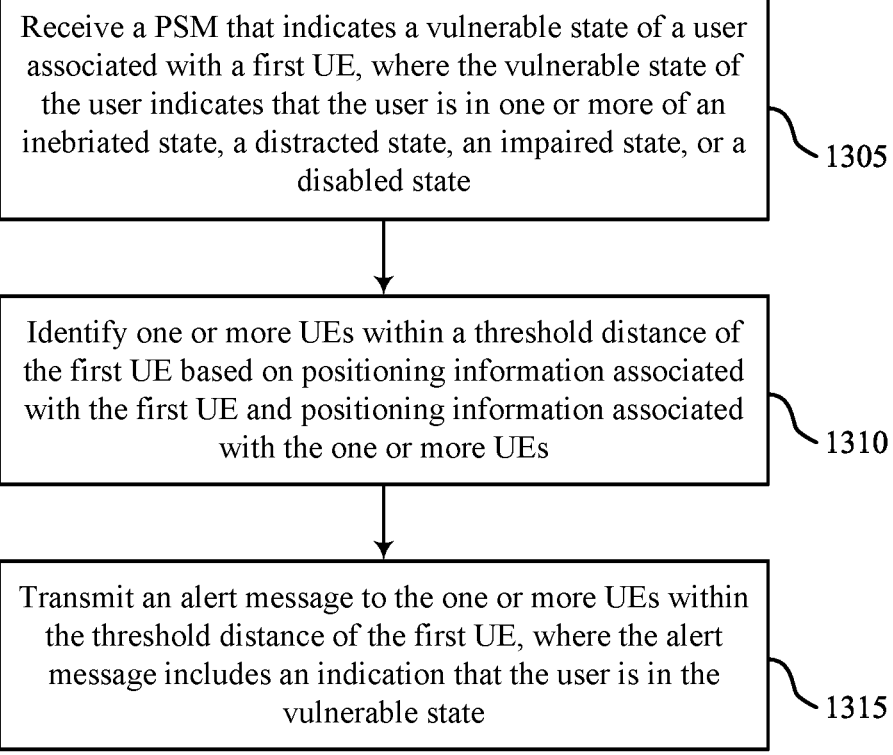

Receive a PSM that indicates a vulnerable state of a user associated with a first UE, where the vulnerable state of the user indicates that the user is in one or more of an inebriated state, a distracted state, an impaired state, or a disabled state

1305

Identify one or more UEs within a threshold distance of the first UE based on positioning information associated with the first UE and positioning information associated with the one or more UEs

1310

Transmit an alert message to the one or more UEs within the threshold distance of the first UE, where the alert message includes an indication that the user is in the vulnerable state

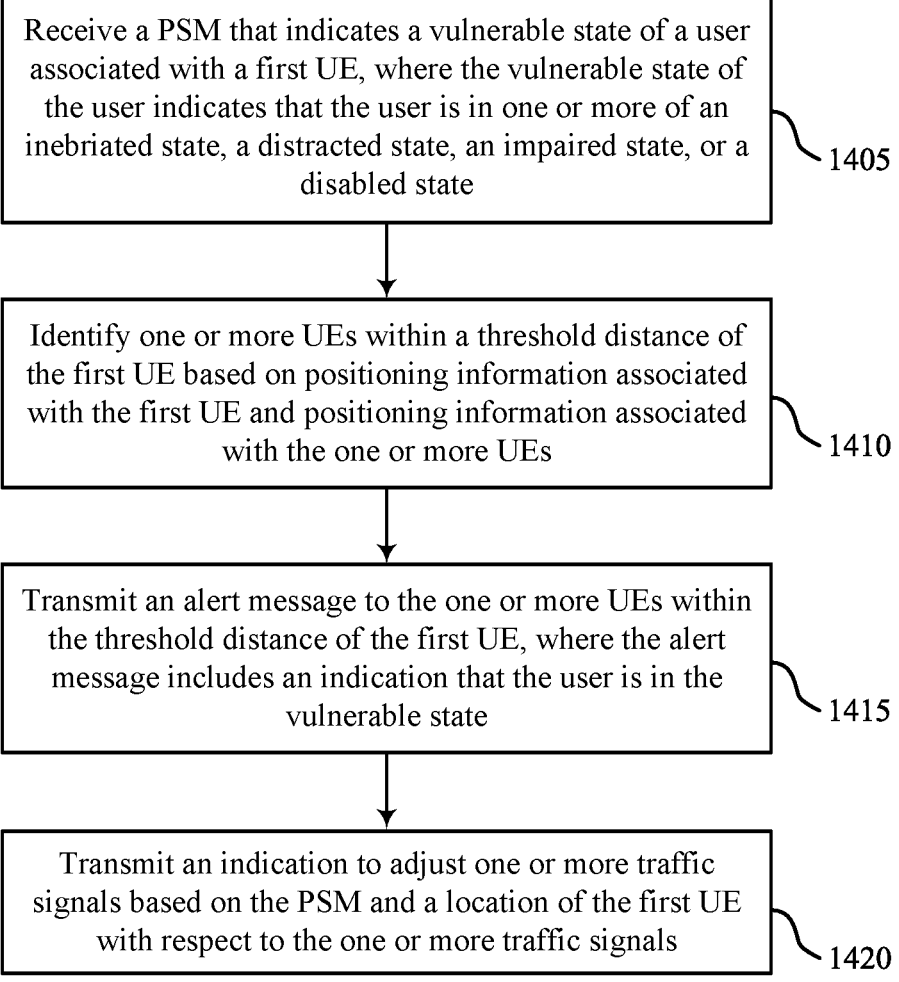

Receive a PSM that indicates a vulnerable state of a user associated with a first UE, where the vulnerable state of the user indicates that the user is in one or more of an inebriated state, a distracted state, an impaired state, or a disabled state — 1405

Identify one or more UEs within a threshold distance of the first UE based on positioning information associated with the first UE and positioning information associated with the one or more UEs — 1410

Transmit an alert message to the one or more UEs within the threshold distance of the first UE, where the alert message includes an indication that the user is in the vulnerable state — 1415

Transmit an indication to adjust one or more traffic signals based on the PSM and a location of the first UE with respect to the one or more traffic signals — 1420

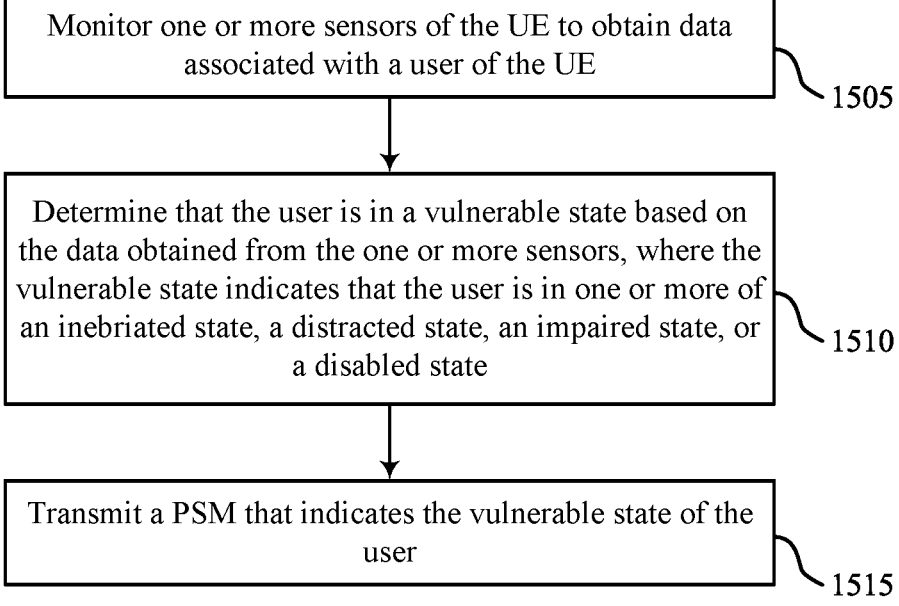

Monitor one or more sensors of the UE to obtain data associated with a user of the UE

1505

Determine that the user is in a vulnerable state based on the data obtained from the one or more sensors, where the vulnerable state indicates that the user is in one or more of an inebriated state, a distracted state, an impaired state, or a disabled state

1510

Transmit a PSM that indicates the vulnerable state of the user

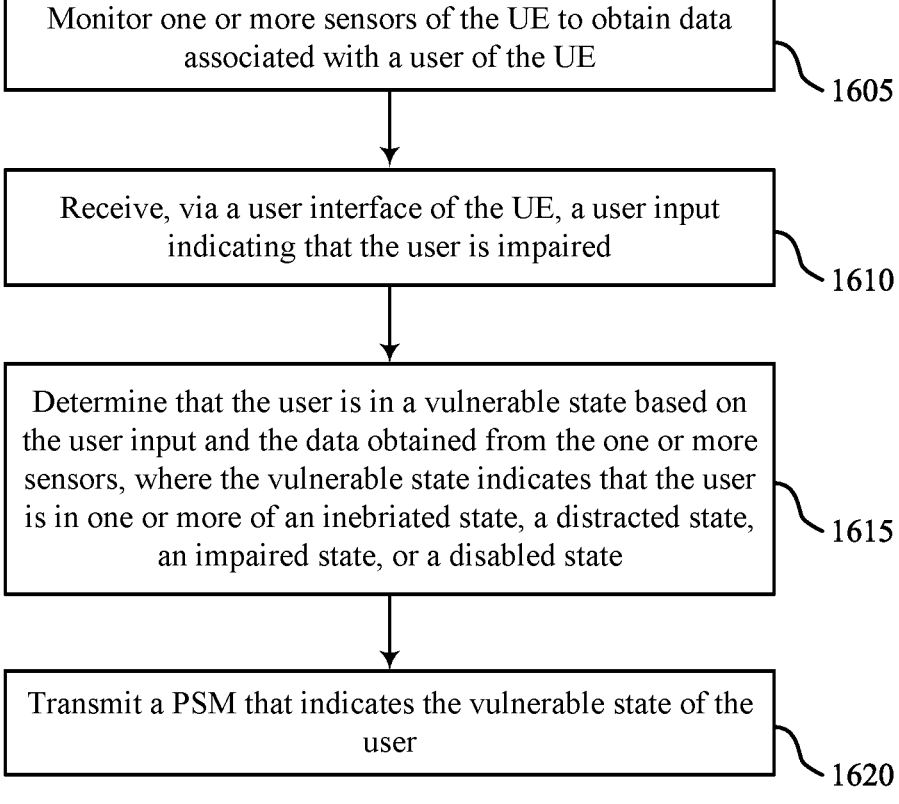

Monitor one or more sensors of the UE to obtain data associated with a user of the UE

1605

Receive, via a user interface of the UE, a user input indicating that the user is impaired

1610

Determine that the user is in a vulnerable state based on the user input and the data obtained from the one or more sensors, where the vulnerable state indicates that the user is in one or more of an inebriated state, a distracted state, an impaired state, or a disabled state

1615

Transmit a PSM that indicates the vulnerable state of the user

TECHNIQUES FOR DETECTING VULNERABLE ROAD USERS

FIELD OF TECHNOLOGY

The following relates to wireless communication, including techniques for detecting vulnerable road users (VRUs).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

Collisions between motor vehicles and road users are responsible for a relatively large number of pedestrian fatalities. The likelihood of a collision occurring between a vehicle and a pedestrian increases when at least one of the users (driver or pedestrian) is distracted or impaired in some manner.

SUMMARY

The described techniques relate to improved methods, systems, devices, and apparatuses that support techniques for detecting vulnerable road users (VRUs). For example, the described techniques may reduce the likelihood of collisions occurring between vehicles and pedestrians in a vehicle-to-everything (V2X) system or a vehicle-to-pedestrian (V2P) system. In accordance with aspects of the present disclosure, a first user equipment (UE) may monitor one or more sensors to obtain data associated with a user of the first UE, and may determine that the user is in a vulnerable (e.g., inebriated, distracted, impaired, disabled) state based on monitoring the one or more sensors. After detecting the vulnerable state of the user, the first UE may transmit a public safety message (PSM) to other devices in the area. Upon receiving the PSM from the UE, a network entity may use positioning information to identify other UEs that are within a threshold distance of the first UE, and may transmit an alert message to these UEs.

A method for wireless communication at a network entity is described. The method may include receiving a PSM that indicates a vulnerable state of a user associated with a first UE, where the vulnerable state of the user indicates that the user is in one or more of an inebriated state, a distracted state, an impaired state, or a disabled state. The method may further include identifying one or more UEs within a threshold distance of the first UE based on positioning information associated with the first UE and positioning information associated with the one or more UEs. The method may further include transmitting an alert message to the one or more UEs within the threshold distance of the first UE, where the alert message includes an indication that the user is in the vulnerable state.

An apparatus for wireless communication at a network entity is described. The apparatus may include a processor, memory coupled with the processor, and instructions stored in the memory. The instructions may be executable by the processor to cause the apparatus to receive a PSM that indicates a vulnerable state of a user associated with a first UE, where the vulnerable state of the user indicates that the user is in one or more of an inebriated state, a distracted state, an impaired state, or a disabled state. The instructions may be further executable by the processor to cause the apparatus to identify one or more UEs within a threshold distance of the first UE based on positioning information associated with the first UE and positioning information associated with the one or more UEs. The instructions may be further executable by the processor to cause the apparatus to transmit an alert message to the one or more UEs within the threshold distance of the first UE, where the alert message includes an indication that the user is in the vulnerable state.

Another apparatus for wireless communication at a network entity is described. The apparatus may include means for receiving a PSM that indicates a vulnerable state of a user associated with a first UE, where the vulnerable state of the user indicates that the user is in one or more of an inebriated state, a distracted state, an impaired state, or a disabled state. The apparatus may further include means for identifying one or more UEs within a threshold distance of the first UE based on positioning information associated with the first UE and positioning information associated with the one or more UEs. The apparatus may further include means for transmitting an alert message to the one or more UEs within the threshold distance of the first UE, where the alert message includes an indication that the user is in the vulnerable state.

A non-transitory computer-readable medium storing code for wireless communication at a network entity is described. The code may include instructions executable by a processor to cause the network entity to receive a PSM that indicates a vulnerable state of a user associated with a first UE, where the vulnerable state of the user indicates that the user is in one or more of an inebriated state, a distracted state, an impaired state, or a disabled state. The instructions may be further executable by the processor to cause the network entity to identify one or more UEs within a threshold distance of the first UE based on positioning information associated with the first UE and positioning information associated with the one or more UEs. The instructions may be further executable by the processor to cause the network entity to transmit an alert message to the one or more UEs within the threshold distance of the first UE, where the alert message includes an indication that the user is in the vulnerable state.

In some examples of the method, apparatuses, and non-transitory computer-readable medium described herein, transmitting the alert message may include operations, features, means, or instructions for transmitting the alert message that indicates the vulnerable state of the user and one or more of a proximity between the first UE and the one or more UEs, a speed of the first UE, or a likelihood of a collision occurring between the first UE and the one or more UEs.

In some examples of the method, apparatuses, and non-transitory computer-readable medium described herein, transmitting the alert message may include operations, features, means, or instructions for transmitting the alert message based on the positioning information associated with the first UE indicating that the first UE is within a threshold distance of a roadway.

In some examples of the method, apparatuses, and non-transitory computer-readable medium described herein, transmitting the alert message may include operations, features, means, or instructions for transmitting the alert message with a priority level that is based on a probability of a collision occurring between the first UE and the one or more UEs.

In some examples of the method, apparatuses, and non-transitory computer-readable medium described herein, transmitting the alert message may include operations, features, means, or instructions for transmitting the alert message with a priority level that is based on a traffic density associated with a location of the first UE, an environmental factor associated with the location of the first UE, a proximity between the first UE and the one or more UEs, a speed of the first UE, a distraction level of the first UE, or a combination thereof.

Some examples of the method, apparatuses, and non-transitory computer-readable medium described herein may further include operations, features, means, or instructions for transmitting an indication to adjust one or more traffic signals based on the PSM and a location of the first UE with respect to the one or more traffic signals.

In some examples of the method, apparatuses, and non-transitory computer-readable medium described herein, receiving the PSM may include operations, features, means, or instructions for receiving the PSM that indicates the vulnerable state of the user and one or more of a speed of the first UE, a blood alcohol content (BAC) level of the user, a distraction level of the user, a heart rate of the user, or a geographic location of the UE.

In some examples of the method, apparatuses, and non-transitory computer-readable medium described herein, receiving the PSM may include operations, features, means, or instructions for receiving the PSM that includes a first set of one or more bits indicating the vulnerable state of the user and a second set of one or more bits indicating one or more vulnerable state types of the user, where the alert message indicates the one or more vulnerable state types of the user.

In some examples of the method, apparatuses, and non-transitory computer-readable medium described herein, identifying the one or more UEs may include operations, features, means, or instructions for identifying that the one or more UEs are within the threshold distance of the first UE based on a speed of the first UE, a geographic location of the first UE, respective geographic locations of the one or more UEs, a direction of motion associated with the first UE, or a proximity between the first UE and the one or more UEs.

In some examples of the method, apparatuses, and non-transitory computer-readable medium described herein, the one or more UEs include vehicle UEs in a V2X communications system.

In some examples of the method, apparatuses, and non-transitory computer-readable medium described herein, the first UE may be a vehicle UE in a V2X communications system and the one or more UEs may be associated with pedestrians within the threshold distance of the vehicle UE.

A method for wireless communication at a UE is described. The method may include monitoring one or more sensors of the UE to obtain data associated with a user of the UE. The method may further include determining that the user is in a vulnerable state based on the data obtained from the one or more sensors, where the vulnerable state indicates that the user is in one or more of an inebriated state, a distracted state, an impaired state, or a disabled state. The method may further include transmitting a PSM that indicates the vulnerable state of the user.

An apparatus for wireless communication at a UE is described. The apparatus may include a processor, memory coupled with the processor, and instructions stored in the memory. The instructions may be executable by the processor to cause the apparatus to monitor one or more sensors of the UE to obtain data associated with a user of the UE. The instructions may be further executable by the processor to cause the apparatus to determine that the user is in a vulnerable state based on the data obtained from the one or more sensors, where the vulnerable state indicates that the user is in one or more of an inebriated state, a distracted state, an impaired state, or a disabled state. The instructions may be further executable by the processor to cause the apparatus to transmit a PSM that indicates the vulnerable state of the user.

Another apparatus for wireless communication at a UE is described. The apparatus may include means for monitoring one or more sensors of the UE to obtain data associated with a user of the UE. The apparatus may further include means for determining that the user is in a vulnerable state based on the data obtained from the one or more sensors, where the vulnerable state indicates that the user is in one or more of an inebriated state, a distracted state, an impaired state, or a disabled state. The apparatus may further include means for transmitting a PSM that indicates the vulnerable state of the user.

A non-transitory computer-readable medium storing code for wireless communication at a UE is described. The code may include instructions executable by a processor to cause the UE to monitor one or more sensors of the UE to obtain data associated with a user of the UE. The instructions may be further executable by the processor to cause the UE to determine that the user is in a vulnerable state based on the data obtained from the one or more sensors, where the vulnerable state indicates that the user is in one or more of an inebriated state, a distracted state, an impaired state, or a disabled state. The instructions may be further executable by the processor to cause the UE to transmit a PSM that indicates the vulnerable state of the user.

Some examples of the method, apparatuses, and non-transitory computer-readable medium described herein may further include operations, features, means, or instructions for receiving, via a user interface of the UE, a user input indicating that the user is impaired, where determining that the user is in a vulnerable state is based on the user input.

In some examples of the method, apparatuses, and non-transitory computer-readable medium described herein, monitoring the one or more sensors may include operations, features, means, or instructions for monitoring one or both of a camera of the UE or a geospatial sensor of the UE to obtain facial recognition data, motion data, positioning data, or a combination thereof, where determining that the user is in the vulnerable state is based on the monitoring.

In some examples of the method, apparatuses, and non-transitory computer-readable medium described herein, transmitting the PSM may include operations, features, means, or instructions for transmitting the PSM based on a speed of the UE and a position of the user relative to a camera of the UE.

In some examples of the method, apparatuses, and non-transitory computer-readable medium described herein, monitoring the one or more sensors may include operations, features, means, or instructions for monitoring a camera of the UE, a motion sensor of the UE, a blood alcohol sensor associated with the UE, an insulin meter associated with the UE, a wearable device associated with the UE, a blood glucose sensor associated with the UE, a breath analyzer associated with the UE, a pedometer associated with the UE, or a combination thereof.

In some examples of the method, apparatuses, and non-transitory computer-readable medium described herein, determining that the user is in the vulnerable state may include operations, features, means, or instructions for determining that the user is in the vulnerable state based on using a machine learning model to analyze the data obtained from the one or more sensors.

In some examples of the method, apparatuses, and non-transitory computer-readable medium described herein, transmitting the PSM may include operations, features, means, or instructions for transmitting the PSM based on determining that the user is moving within a time duration of a BAC level of the user exceeding a threshold.

In some examples of the method, apparatuses, and non-transitory computer-readable medium described herein, transmitting the PSM may include operations, features, means, or instructions for transmitting the PSM based on a BAC level of the user and a speed of the UE.

In some examples of the method, apparatuses, and non-transitory computer-readable medium described herein, transmitting the PSM may include operations, features, means, or instructions for signaling the vulnerable state of the user via one or more bits corresponding to a perceived state field in the PSM.

In some examples of the method, apparatuses, and non-transitory computer-readable medium described herein, transmitting the PSM may include operations, features, means, or instructions for transmitting the PSM that includes a first set of one or more bits indicating the vulnerable state of the user and a second set of one or more bits indicating one or more vulnerable state types of the user.

In some examples of the method, apparatuses, and non-transitory computer-readable medium described herein, the UE includes a vehicle connected to a V2X communications system and the one or more sensors include an accelerometer of the vehicle, a camera associated with the vehicle, a global positioning system (GPS) sensor associated with the vehicle, a breath analyzer connected to the vehicle, or a combination thereof.

In some examples of the method, apparatuses, and non-transitory computer-readable medium described herein, transmitting the PSM may include operations, features, means, or instructions for transmitting the PSM in response to determining that the user is operating the vehicle while in the vulnerable state.

BRIEF DESCRIPTION OF THE DRAWINGS

FIGS. 13 through 16 show flowcharts illustrating methods that support techniques for detecting VRUs in accordance with one or more aspects of the present disclosure.

DETAILED DESCRIPTION

Figure 1:
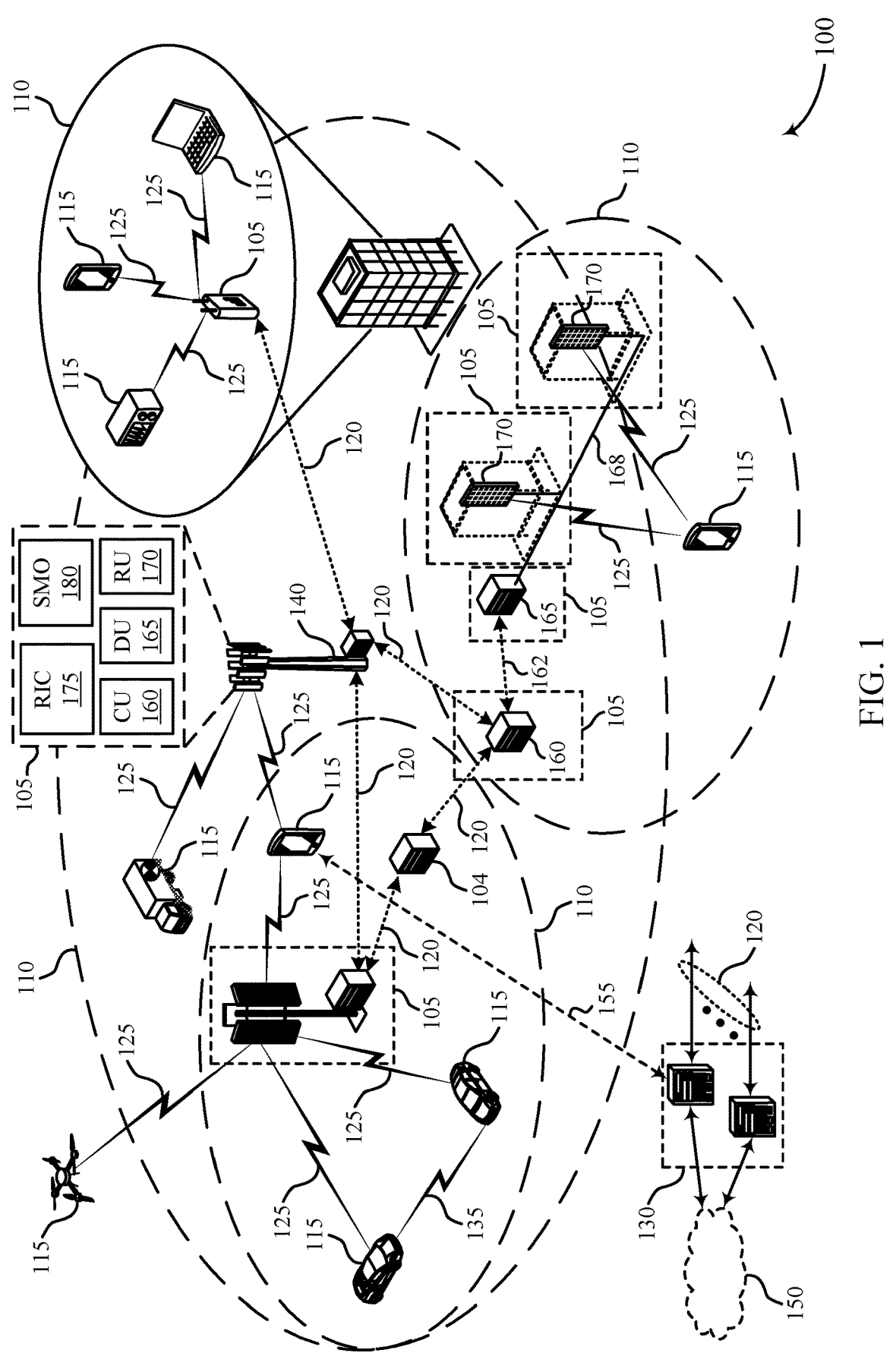
FIGS. 1 through 3 illustrate examples of wireless communications systems that support techniques for detecting vulnerable road users (VRUs) in accordance with one or more aspects of the present disclosure.

Some wireless communications systems may support vehicle-to-pedestrian (V2P) communications. V2P communications may increase the safety of pedestrians and vehicle operators in a geographic area. Some systems that support V2P communications may use a vulnerable road user (VRU) alert system to notify other users (drivers or pedestrians) of potentially dangerous situations. To support this functionality, a user equipment (UE) in a V2P system may be connected to a network entity (such as a car-to-cloud (C2C) server) via one or more communication links. The network entity may track the location, direction of travel, and speed of different vehicles and VRUs (pedestrians) in a geographic area. The network entity may use this information to mitigate potential collisions between vehicles and VRUs.

In some cases, the network entity may calculate the probability of a collision occurring between a vehicle and a pedestrian, and may transmit an alert to one or both users (driver or pedestrian) if the calculated probability surpasses a threshold. The likelihood of a collision occurring between a pedestrian and a driver increases when one or both individuals are in a vulnerable (e.g., inebriated, distracted, impaired) state. In some cases, however, the network entity may be unable to determine if one or both individuals are in a vulnerable state. As such, the network entity may be unable to accurately predict and avert collisions between vehicles and pedestrians.

In accordance with aspects of the present disclosure, a UE may determine whether a user of the UE is in a vulnerable state based on data from various sensors of the UE. As described herein, a user of a UE may refer to a user or individual that is operating or interacting with a UE in some manner. For example, a user of a UE may refer to a driver operating a vehicle UE or a pedestrian interacting with a mobile (handheld) UE. Upon detecting that the user is in a vulnerable state, the UE may transmit a public safety message (PSM) to other devices in the area. In response to the PSM, a network entity may identify other devices associated with pedestrians or drivers in the vicinity of the vulnerable user, and may transmit an alert to these devices. In some examples, the network entity may transmit the alert with a priority level that is based on a probability of a collision occurring between the vulnerable user (or the UE) and other pedestrians or drivers in the area. For example, the network entity may transmit a high priority alert message (e.g., a heightened alert) to other devices if there is a relatively high probability of a collision occurring between the vulnerable user and a nearby pedestrian or driver.

Additionally or alternatively, the network entity may weight or adjust the priority of the alert message based on environmental factors (e.g., weather conditions, visibility, time-of-day) or traffic volume. The UE may determine that the user is in a vulnerable state based on a blood alcohol content (BAC) level of the user, a speed of the UE, a proximity of the UE to a roadway or crosswalk, or a position of the user with respect to a camera of the UE, among other examples. In some examples, the UE may determine that the user is in a vulnerable state by using a machine learning model to analyze data from external sensors like an insulin pump, a wearable device, a pedometer, or a breathalyzer.

Aspects of the present disclosure may be implemented to realize one or more of the following advantages. The described techniques may reduce the probability of VRUs colliding with other users (drivers or pedestrians) in a V2P system. For example, if a UE determines (based on sensor data) that a user is in a vulnerable state, the UE may signal the vulnerable state to a network entity (e.g., via a PSM) such that the network entity can alert other users in the area. In some examples, the network entity may configure or adjust network settings (e.g., traffic lights, crosswalk signals) to further reduce the likelihood of the user colliding with other vehicles or pedestrians. Thus, configuring the UE to transmit a PSM in response to detecting that the user is in a vulnerable state may improve the overall safety of the V2P system.

Aspects of the disclosure are initially described in the context of wireless communications systems and process flows. Aspects of the disclosure are further illustrated by and described with reference to apparatus diagrams, system diagrams, and flowcharts that relate to techniques for detecting VRUs.

FIG. 1 illustrates an example of a wireless communications system 100 that supports techniques for detecting VRUs in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, or computing system may include disclosure of the UE 115, network entity 105, apparatus, device, or computing system being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), or a virtual RU.

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for detecting VRUs, as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multicarrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

Some wireless communications systems may use V2P communications to increase the safety of pedestrians and vehicle operators in a given area. In such systems, a UE 115 may determine that a user is in a vulnerable state and transmit an indication of the vulnerable state to a network entity 105. For example, the UE 115 may monitor one or more sensors to obtain data associated with the user of the UE 115. The UE 115 may analyze the data and determine that the user is in a vulnerable state. The vulnerable state of the user may be an inebriated state, an impaired state, a distracted state, or a disabled state. Accordingly, the UE 115 may transmit a PSM that indicates the vulnerable state of the user of the UE 115.

The network entity 105 may identify one or more UEs 115 within a threshold distance of the vulnerable user based on positioning data associated with the one or more UEs 115 and positioning data associated with the UE 115 of the vulnerable user. The network entity may transmit an alert message to the one or more UEs within the threshold distance. The alert message may include an indication of the vulnerable state of the user and may have varying levels of priority.

Aspects of the wireless communications system 100 may be implemented to realize one or more of the following advantages. The techniques described with reference to FIG. 1 may reduce the probability of VRUs colliding with other users (drivers or pedestrians) in the wireless communications system 100. For example, if a UE 115 determines (based on sensor data) that a user is in a vulnerable state, the UE 115 may signal the vulnerable state to a roadside unit (RSU) or a network entity 105 such that the network entity 105 can alert other users in the area. In some examples, the network entity 105 may configure or adjust network settings (e.g., traffic lights, crosswalk signals) to further reduce the likelihood of the user colliding with other vehicles or pedestrians. Thus, configuring the UE 115 to transmit a PSM in response to detecting that the user is in a vulnerable state may improve the overall safety of the wireless communications system 100.

Figure 2:
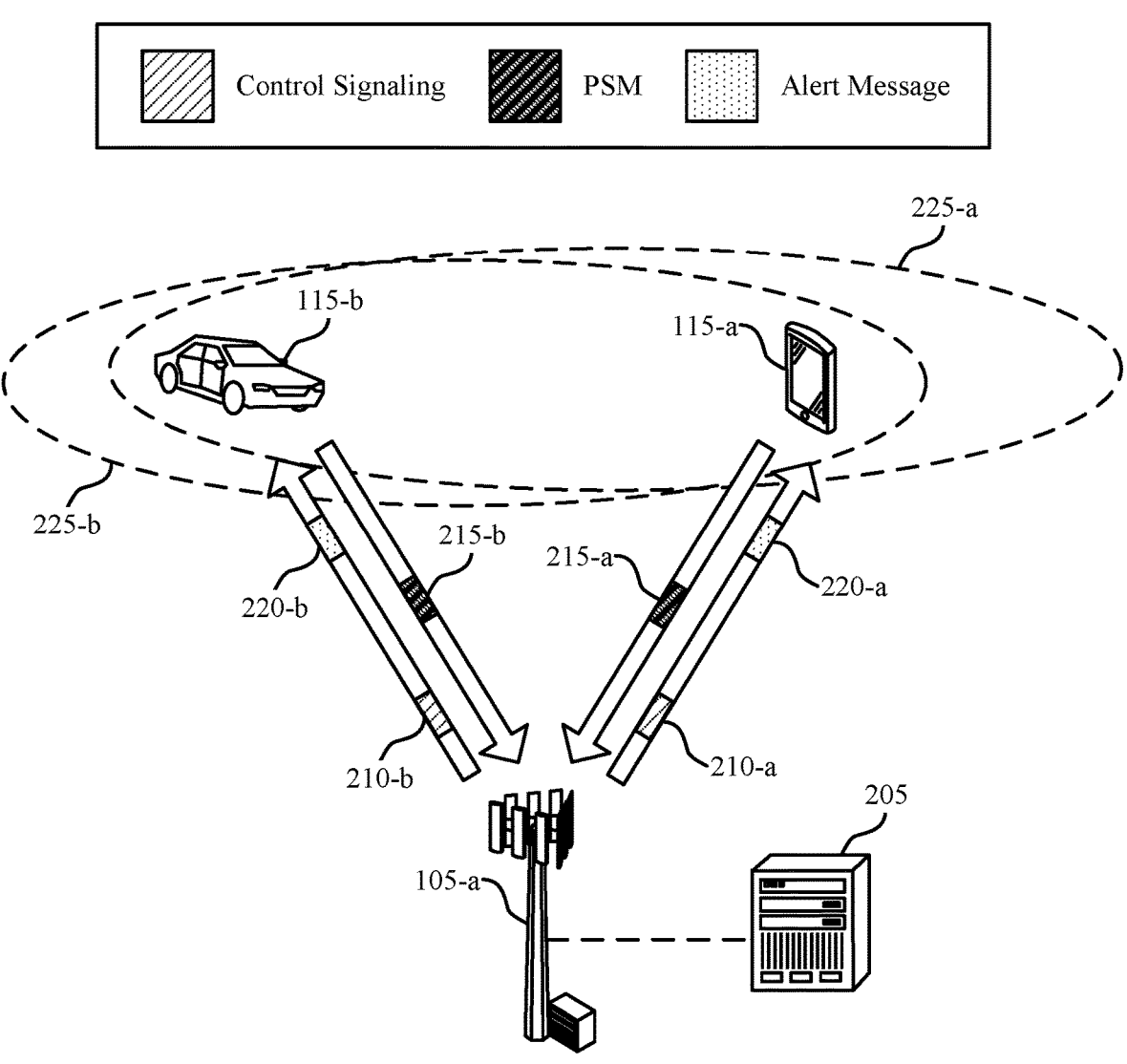

FIG. 2 illustrates an example of a wireless communications system 200 that supports techniques for detecting VRUs in accordance with one or more aspects of the present disclosure. The wireless communications system 200 may implement or be implemented by aspects of wireless communications system 100. For example, the wireless communications system 200 may include a UE 115-a and a UE 115-b (a vehicle UE), which may be examples of a UE 115 described with reference to FIG. 1. Likewise, the wireless communications system 200 may include a network entity 105-a, which may be an example of a network entity 105 described with reference to FIG. 1.

The wireless communications system 200 may support V2P communications between the UEs 115 and the network entity 105-a. V2P systems may improve the safety of pedestrians and vehicle operators in a given area. Due to the frequency of auto-pedestrian accidents (as shown below in Table 1), there is a desire to use V2P communications to enhance safety. For example, the chances of collisions between one or more UEs 115 may increase due to one or more distractions or impairments of a vehicle operator or pedestrian. In some cases, increased blood alcohol levels or distractions (e.g., smart phones, watches, wearables) may increase the probability of collisions between vehicles and pedestrians.

TABLE 1

| VRU Accident Statistics | | | |
|---|---|---|---|
| VRU Type | Scenario | At Fault | Occurrence Frequency |
| Bicycle | Auto turning left collides with bicycle | Auto | 4.5% |
| Bicycle | Auto turning right collides with bicycle | Auto | 5.3% |
| Bicycle | Auto turning right collides with bicycle | Bike | 4.2% |

TABLE 1-continued

VRU Accident Statistics

| VRU Type | Scenario | At Fault | Occurrence Frequency |
|---|---|---|---|
| Bicycle | Auto moving straight collides with bicycle | Auto | 3.8% |
| Bicycle | Auto moving straight collides with bicycle | Bike | 7.7% |
| Bicycle | Auto turning collides with bicycle on wrong side of road | Bike | 7.0% |
| Bicycle | Auto moving straight collides with bicycle on wrong side of road | Bike | 2.4% |
| Pedestrian | Auto turning left collides with Pedestrian | Auto | 10.4% |
| Pedestrian | Auto turning right collides with Pedestrian | Auto | 6.9% |
| Pedestrian | Auto turning right collides with Pedestrian | Pedestrian | 0.3% |
| Pedestrian | Auto moving straight collides with Pedestrian | Auto | 2.4% |
| Pedestrian | Auto moving straight collides with Pedestrian | Pedestrian | 24.4% |

In some cases, a VRU alert system may implemented to provide alerts to one or more pedestrians or vehicle operators. For example, the UE 115-*a* and the UE 115-*b* may be connected to the network entity 105-*a* (via a Uu interface or sidelink connection), and the network entity 105-*a* may be connected to the C2C server 205 via a backhaul connection. The C2C server 205 may obtain information (e.g., positioning information, directional information, velocity information) from the UE 115-*a* or UE 115-*b* via a PSM, Uu positioning data, or sidelink positioning data, among other examples. The C2C server 205 may have access to maps that identify different objects (e.g., traffic signals, stop lights, crosswalks) in a given area.

The C2C server 205 may provide an alert message 220-*a* to the UE 115-*a* and an alert message 220-*b* the UE 115-*b* whenever there is a possibility of collision based on the current location, speed, or direction of the UEs 115. However, the C2C server 205 may be unable to determine whether a user is in a vulnerable state without an indication from the UE 115-*a* or the UE 115-*b*. Without information related to the perceived state of the user, the chances of collision may be increased when either the user of the UE 115-*a* or the vehicle operator of the UE 115-*b* is distracted or impaired in some manner. The techniques described herein may enable the UE 115-*a* and the UE 115-*d* to identify a vulnerable state of a user. Additionally, the techniques described herein provide for notifying one or more UEs 115 of a VRU.

In the wireless communications system 200, one or more of the UEs 115 may identify a vulnerable state of a user and transmit a PSM indicating the vulnerable state to the network entity 105-*a*, which may relay the PSM to the C2C server. In some examples, the network entity 105-*a* may transmit control signaling 210-*a* and control signaling 210-*b* to the UE 115-*a* and the UE 115-*b*, respectively. The control signaling 210 may configure the UE 115-*a* and the UE 115-*b* with a PSM format that includes a perceived state field.

In some cases, the UE 115-*a* may monitor one or more sensors and determine that the user is in a vulnerable state based on data from the one or more sensors. The UE 115-*a* may transmit a PSM 215-*a* to the network entity 105-*a*. The PSM 215-*a* may indicate the vulnerable state of the user and provide data (e.g., location, direction, speed) associated with the UE 115-*a*. The C2C server 205 may receive the PSM 215-*a* via a connection with the network entity 105-*a*. Accordingly, the C2C server 205 may identify one or more devices within a threshold distance 225-*a* of UE 115-*a*. For example, the C2C server 205 may identify that the UE 115-*b* is within the threshold distance 225-*a* of the UE 115-*a* based on positioning information associated with the UE 115-*a* and positioning information associated with the UE 115-*b*. Upon detecting that the UE 115-*b* is within the threshold distance 225-*a* of the UE 115-*a*, the C2C server 205 may output an alert message 220-*b* to the network entity 105-*b* such that the network entity 105-*a* can transmit the alert message 220-*b* to the UE 115-*b*. The C2C server 205 may generate the alert message 220-*b* with varying degrees of priority based on the vulnerable state of the user or other parameters (weather conditions, relative proximity, collision probability). The alert message 220-*b* to may indicate the vulnerable state of the user associated with the UE 115-*a*.

In accordance with the described techniques, the UE 115-*b* may monitor one or more vehicle sensors and determine that the vehicle operator is in a vulnerable state based on data from the vehicle sensors. The UE 115-*b* may transmit a PSM 215-*b* to the network entity 105-*a*. The PSM 215-*b* may indicate the vulnerable state of the user and provide data (e.g., location, direction, speed) associated with the UE 115-*b*. The C2C server 205 may receive the PSM 215-*b* (via the network entity 105-*a*) and identify one or more devices within a threshold distance 225-*b* of the UE 115-*b*. For example, the C2C server 205 may identify that the UE 115-*a* is within a threshold distance 225-*b* of the UE 115-*b* based on positioning information associated with the UE 115-*a* and positioning information associated with the UE 115-*b*. Accordingly, the C2C server 205 may output an alert message 220-*a* to the network entity 105-*a* such that the network entity 105-*a* can transmit the alert message 220-*a* to the UE 115-*a*. The C2C server 205 may generate the alert message 220-*a* with varying degrees of priority based on the vulnerable state of the vehicle operator or other parameters (weather conditions, relative proximity, collision probability). The alert message 220-*a* may indicate the vulnerable state of the vehicle operator associated with the UE 115-*b*.

Aspects of the wireless communications system 200 may be implemented to realize one or more of the following advantages. The techniques described with reference to FIG. 2 may reduce the probability of VRUs colliding with other users (drivers or pedestrians) in the wireless communications system 200. For example, if the UE 115-*a* determines that a user of the UE 115-*a* is in a vulnerable state, the UE 115-*a* may indicate the vulnerable state to the network entity 105-*a* (e.g., an RSU) such that the network entity 105-*a* (or the C2C server 205) can alert other users in the area. In some examples, the C2C server 205 may configure or adjust network settings (e.g., traffic lights, crosswalk signals) to further reduce the likelihood of the user colliding with other vehicles or pedestrians. Thus, configuring the UE 115-*a* to transmit a PSM in response to detecting that the user is in a vulnerable state may improve the overall safety of the wireless communications system 200.

Figure 3:
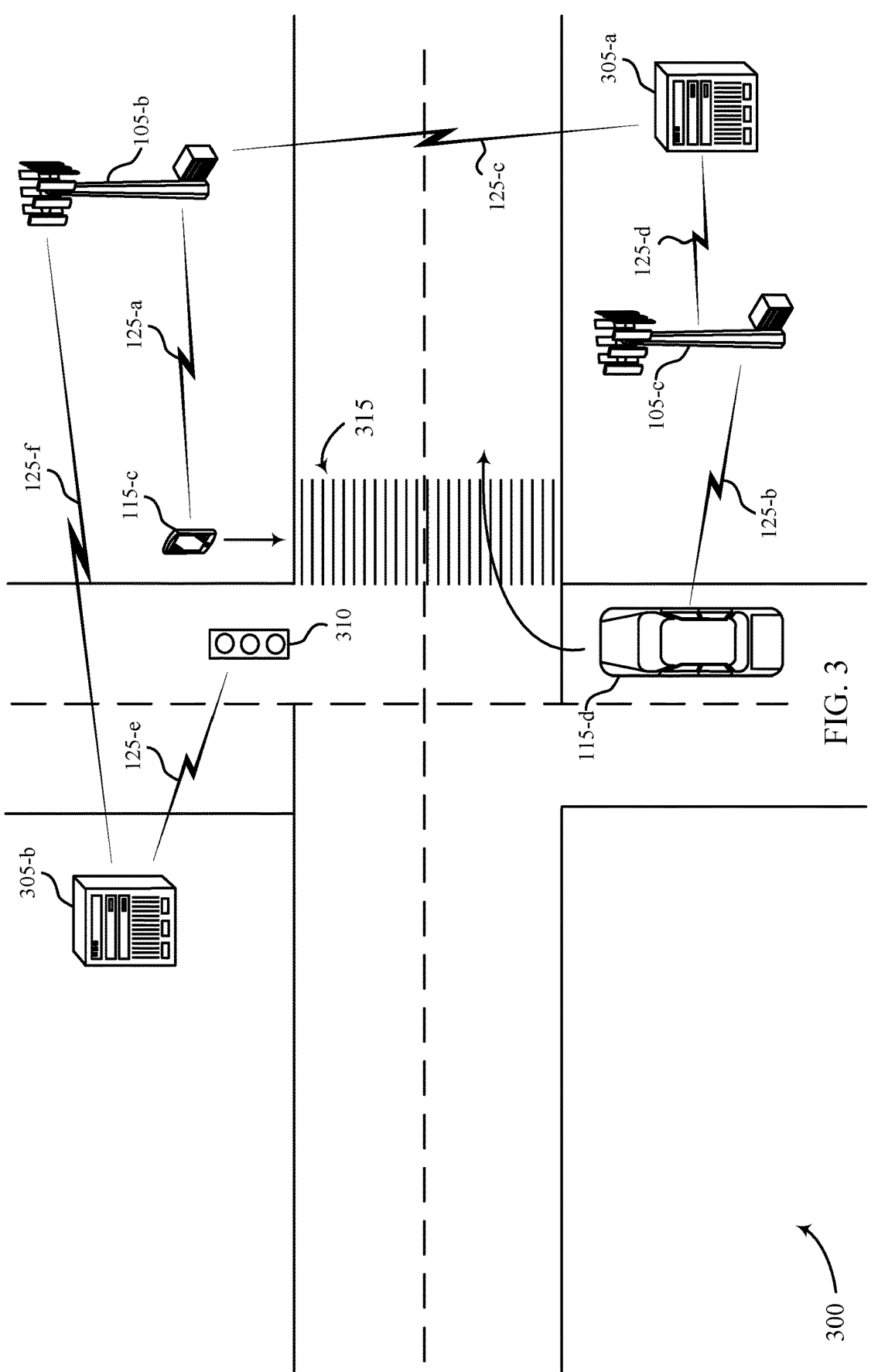

FIG. 3 illustrates an example of a wireless communications system 300 that supports techniques for detecting VRUs in accordance with one or more aspects of the present disclosure. The wireless communications system 300 may implement or be implemented by aspects of the wireless communications system 100 or the wireless communications system 200. For example, the wireless communications system 300 may include a network entity 105-*b* and a network entity 105-*c*, which may be examples of corresponding devices with reference to FIGS. 1 and 2. Likewise, the wireless communications system 300 may include a UE 115-*c* and a UE 115-*d*, which may be examples of corresponding devices with reference to FIGS. 1 and 2. Additionally, the wireless communications system 300 may include a C2C server 305-*a* and a C2C server 305-*b*, which may examples of a C2C server 205 described with reference to FIG. 2.

In the wireless communications system 300, the UE 115-*c* may communicate with the network entity 105-*b* via a communication link 125-*a*. Likewise, the UE 115-*d* may communicate with the network entity 105-*c* via a communication link 125-*b*. The communication link 125-*a* and the communication link 125-*b* may be examples of Uu interfaces or sidelink connections. The network entity 105-*b* may communicate with the C2C server 305-*a* via a communication link 125-*c*, and the network entity 105-*c* may communicate with the C2C server 305-*a* via a communication link 125-*d*. Similarly, the network entity 105-*b* may communicate with the C2C server 305-*b* via a communication link 125-*f*. The communication links 125 between the network entities 105 and the C2C servers 305 may be examples of an Xn interface described with reference to FIG. 1. Each of the network entities 105 may communicate with the C2C servers 305 via a wired connection or a wireless connection. The network entities 105 may relay messages from the UEs 115 to the C2C servers 305 in accordance with aspects of the present disclosure.

In the example of FIG. 3, the UE 115-*c* may indicate that a VRU (e.g., user) is distracted when the VRU is facing a camera of the UE 115-*c* and moving (e.g., walking, jogging, cycling, on a scooter). For example, the UE 115-*c* may use the camera and facial recognition software to recognize a face or an eye of the VRU. Additionally, or alternatively, a watch or other wearable with a camera may detect that the VRU is viewing the screen. Furthermore, eBooks, tablets, or other screen-based devices with cameras may detect that the VRU is viewing the screen. The UE 115-*c* may determine the VRU is moving based on a pedometer application, geospatial information, or both. Additionally, or alternatively, a watch or wearable may recognize when the VRU may be moving. If the UE 115-*c* identifies that the VRU is viewing the screen and moving, the UE 115-*c* may indicate that the VRU is distracted in a PSM message to the network entity 105-*b*. A field called perceived state may be included in the PSM, and may be set to denote that the VRU may be currently distracted. Other optional fields may be included in the PSM to denote one or more specific types of distraction detected by the UE 115-*c*.

The C2C servers 305 may receive the PSM (via the network entity 105-*b*) and generate an alert message based on the distracted state of the VRU. The C2C servers 305 may adjust the priority of the alert based on the relative proxim-ity, speed, environment (e.g., day, night, rain, snow, fog), and level of VRU distraction. In some cases, if the UE 115-*c* and the UE 115-*d* are on a collision course, the C2C servers 305 or the network entities 105 may transmit a higher priority alert message to the UE 115-*d*. The higher priority alert message may indicate (to the operator of the UE 115-*d*) the distracted state of the VRU.

In some other cases, the C2C servers 305 may identify that the UE 115-*c* is on a crosswalk 315 based on a reported location of the UE 115-*c*. In such cases, the C2C servers 305 may transmit a higher priority alert message for all vehicles that are in the vicinity of the VRU. For example, the C2C servers 305 may identify that the UE 115-*d* is within a threshold distance of the UE 115-*c*, as well as any other UEs within the threshold distance of the UE 115-*c*. Additionally, or alternatively, depending on the environment (e.g., urban, rural, residential place) of the UE 115-*c* or the distracted state of the VRU, the C2C servers 305 may transmit varying degrees of alert messages to other devices.

In some examples, the UEs 115 may indicate VRU impairment to the C2C servers 305. In some cases, the UE 115-*c* may monitor a BAC level of a user. For example, the UE 115-*c* may monitor the BAC of the VRU if the UE 115-*c* is paired or connected to a breath analyzer. The UE 115-*c* may store the latest test results of the VRU and the time at which these results were measured. If the VRU starts walking (e.g., inferred by a pedometer application) within a time threshold of the last measurement and the BAC of the VRU is greater than a threshold, the UE 115-*c* may set the perceived state field of the VRU to be distracted. Additionally, or alternatively, the UE 115-*c* may be equipped with an insulin meter or blood glucose monitor, which may serve as an indicator of VRU attentiveness. For example, if the blood glucose level of the VRU falls below a certain threshold, the UE 115-*c* may determine an indication of an impairment to attention. The UE 115-*c* may indicate in the perceived state field that the VRU is distracted or impaired and transmit this PSM to the C2C servers 305.

In some examples, the UE 115-*c* may use a machine learning model to monitor the direction (e.g., heading) and speed of the VRU and classify whether the VRU is distracted. The machine learning model may be configured by UE 115-*c* to determine the perceived VRU state based on the geography, environment, or both, of the UE 115-*c*. In some other cases, the UE 115-*d* may monitor the alertness of driver. The UE 115-*d* may obtain the alertness of the driver based on monitoring a camera of the vehicle. Furthermore, a breath analyzer may be embedded in the steering wheel of the UE 115-*d*, and may be used to monitor the BAC level of the driver. The UE 115-*d* (e.g., an ego vehicle UE) may set the perceived state of the VRU to be distracted based on the outcome of the breath analyzer or camera. The UE 115-*d* may transmit the PSM to the C2C servers 305.

The C2C servers 305 may use the location of the VRU, an activity status of the VRU (e.g., walking, sitting, driving), a perceived state of the VRU (as indicated by the UE 115-*c*), or a map to provide different alerts to UEs 115 in the vicinity of the distracted VRU. For example, the C2C servers 305 may receive the PSM and identify one or more UEs within a threshold distance of the UEs 115 and transmit an alert message based on the data associated with the PSM.

Additionally, the C2C servers 305 may transmit one or more heightened alerts based on a type (e.g., disabled, using a wheelchair) of the VRU. In some examples, an impaired VRU may indicate a presence of impairment to the UE 115-*c* via a user input (e.g., impaired bit set in the PSM). The UE 115-*c* may transmit the PSM to the C2C servers 305. The C2C servers 305 may identify that the UE 115-*d* is within the vicinity of the UE 115-*c* and determine a probability of collision. Even if the probability of collision is low, the C2C servers 305 may provide varying degrees of alert messages to the UE 115-*d* in consideration of the VRU impairment. For example, upon receiving an indication of the distracted or impaired state of the VRU, the C2C server 305-*b* may adjust or control a traffic signal 310 via a communication link 125-*e*. Although the collision probability between the UE 115-*d* and the UE 115-*c* may be relatively low, the C2C server 305-*b* may consider the distracted or impaired state of the VRU and change the traffic signal 310 to red. This may ensure that the UE 115-*d* comes to a stop and enables the distracted VRU to successfully traverse the crosswalk 315.

Aspects of the wireless communications system 300 may be implemented to realize one or more of the following advantages. The techniques described with reference to FIG. 3 may reduce the probability of VRUs colliding with other users (drivers or pedestrians) in the wireless communications system 300. For example, if the UE 115-*c* determines that a user of the UE 115-*c* is in a vulnerable state, the UE 115-*c* may indicate the vulnerable state to the network entity 105-*b* such that the network entity 105-*b* (or the C2C servers 305) can alert other users in the area. In some examples, the C2C servers 305 may configure or adjust network settings (e.g., the traffic signal 310) to further reduce the likelihood of the user colliding with other vehicles or pedestrians. Thus, configuring the UE 115-*c* to transmit a PSM in response to detecting that the user is in a vulnerable state may improve the overall safety of the wireless communications system 300.

Figure 4:
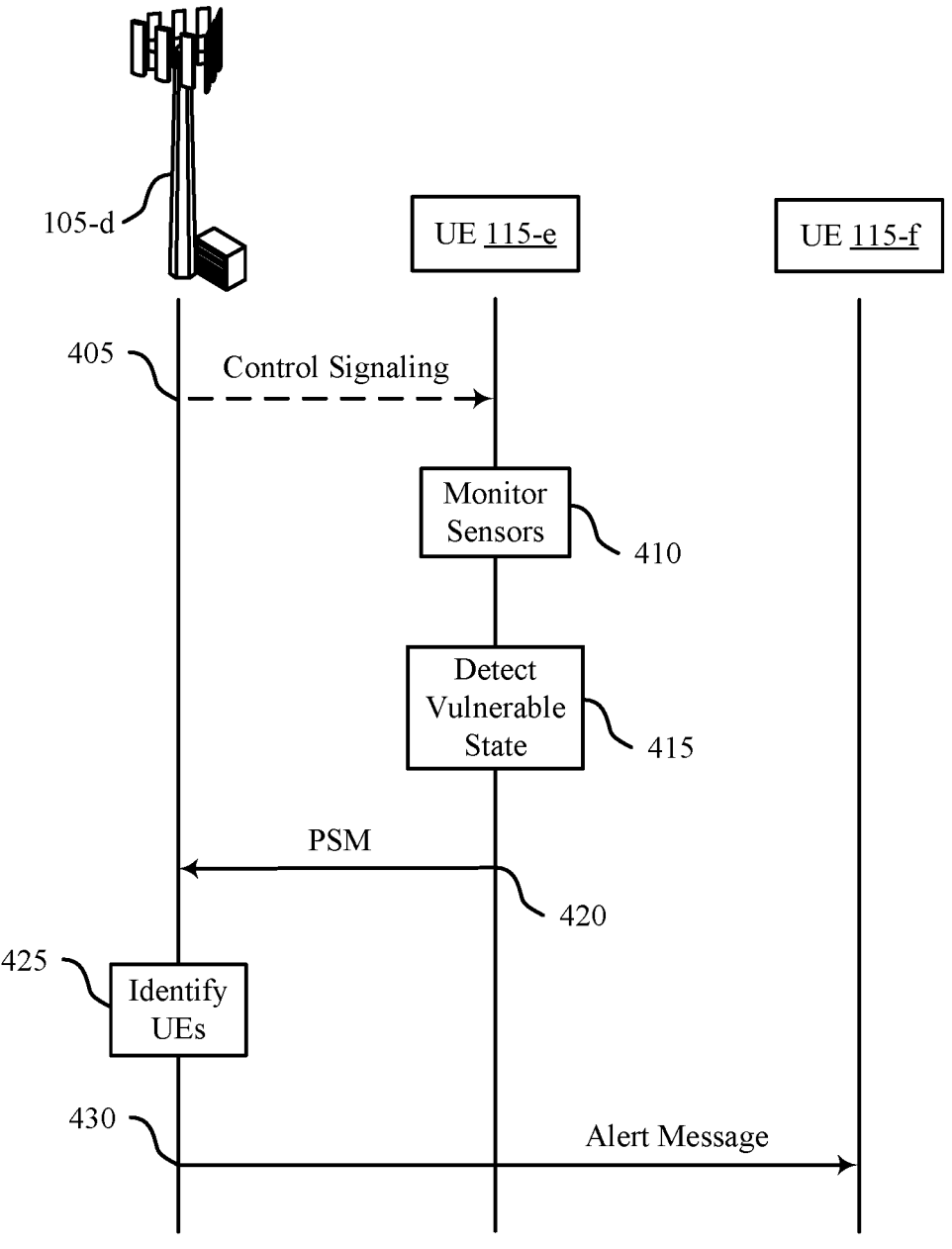
FIG. 4 illustrates an example of a process flow that supports techniques for detecting VRUs in accordance with one or more aspects of the present disclosure.

FIG. 4 illustrates an example of a process flow 400 that supports techniques for detecting VRUs in accordance with one or more aspects of the present disclosure. The process flow 400 may implement or be implemented by aspects of the wireless communications system 100, the wireless communications system 200, or the wireless communications system 300, as described herein with references to FIGS. 1 through 3. For example, the process flow 400 may include a network entity 105-*d*, a UE 115-*e*, and a UE 115-*d*, which may be examples of corresponding devices described herein with reference to FIGS. 1 through 3. In the following description of the process flow 400, operations between the network entity 105-*d*, the UE 115-*e*, and the UE 115-*f* may be performed in a different order or at a different time than as shown. Additionally, or alternatively, some operations may be omitted from the process flow 400, and other operations may be added to the process flow 400.

In some implementations of process flow 400, at 405 the network entity 105-*d* may transmit control signaling to the UE 115-*f*. The control signaling may configure the UE 115-*e* with a PSM format that includes a perceived state field. At 410, the UE 115-*e* may monitor one or more sensors to obtain data associated with the user. For example, the UE 115-*e* may monitor one or more of a camera, a geospatial sensor, a blood alcohol sensor, an insulin meter, a wearable device, a blood glucose sensor, a breath analyzer, a pedometer, or a combination thereof. In some cases, the UE 115-*e* may be a vehicle connected to a V2X communications systems. In such cases, the UE 115-*e* may monitor one or more vehicle sensors that include an accelerometer, a camera, a global positioning system (GPS), a breath analyzer connected to the vehicle, or a combination thereof.

At 415, the UE 115-*e* may determine that the user is in a vulnerable state based on the data obtained from the one or more sensors. The vulnerable state of the user may be an inebriated state, a distracted state, an impaired state, or a disabled state. In some cases, the UE 115-*e* may receive, via a user interface of the UE 115-*e*, a user input indicating that the user is impaired. Additionally, the UE 115-*e* may determine that the user is in a vulnerable state based on obtained facial recognition data, motion data, positioning data, or a combination thereof. Furthermore, the UE 115-*e* may determine the vulnerable state of the user based on using a machine learning model to analyze the data obtained from the one or more sensors.

At 420, the UE 115-*e* may transmit, and the network entity 105-*d* may receive, a PSM that indicates the vulnerable state of the user. The PSM may be an example of a PSM 215 described with reference to FIG. 2. For example, the UE 115-*e* may transmit the PSM that signals the vulnerable state of the user via one or more bits in a perceived state field in the PSM. Additionally, the PSM may include a set of bits that indicate a distraction type (e.g., vulnerable state type) detected for the user, and different values of the bits may indicate one or more different distraction types detected for the user (e.g., the VRU is in one or more of an inebriated state, a distracted state, an impaired state, or a disabled state). The PSM may also indicate a speed of the UE 115-*e*, a BAC level of the user, a distraction level of the user, a heart rate of the user, or a geographic location of the UE 115-*e*, among other examples.

In some cases, the UE 115-*e* may transmit the PSM based on a speed of the UE 115-*e* and a position of the user relative to the camera of the UE 115-*e*. In some other cases, the UE 115-*e* may transmit the PSM based on determining the user is moving within a time duration of a BAC level of the user exceeding a threshold or based on the BAC level of the user and a speed of the UE 115-*e*. Alternatively, the UE 115-*e* may transmit the PSM in response to determining that the user is operating a vehicle while in a vulnerable state.

At 425, the network entity 105-*d* may identify that the UE 115-*f* is within a threshold distance of the UE 115-*e*. In some cases, the UE 115-*f* may be a vehicle UE in a V2X communications system. In some other cases, the UE 115-*e* may be a vehicle UE in a V2X communications system, while the UE 115-*f* may correspond to a pedestrian within a threshold distance of the UE 115-*e* (a vehicle UE). The network entity 105-*d* may identify that the UE 115-*f* is within a threshold distance of the UE 115-*e* based on positioning information associated with the UE 115-*f* and positioning information associated with the UE 115-*e*. Additionally or alternatively, the network entity 105-*d* may identify that the UE 115-*f* is within a threshold distance of the UE 115-*e* based on a speed of the UE 115-*e*, a geographic location of the UE 115-*e*, a geographic location of the UE 115-*f*, a direction of motion associated with the UE 115-*e*, or a proximity between the UE 115-*e* and the UE 115-*f*.

At 430, the network entity 105-*d* may transmit an alert message to the UE 115-*f*. The alert message may include an indication that the user is of the UE 115-*e* is in a vulnerable state, a proximity between the UE 115-*e* and the UE 115-*f*, a speed of the UE 115-*f*, a likelihood of a collision occurring between the UE 115-*e* and the UE 115-*f*, or a combination thereof. The network entity 105-*d* may transmit the alert message with a priority level that corresponds to a probability of collision between the UE 115-*e* and the UE 115-*f*. The priority level of the alert message may be based on a traffic density associated with a location of the UE 115-*e*, an environmental factor associated with the UE 115-*e*, a proximity between the UE 115-*e* and the UE 115-*f*, a speed of the UE 115-*e*, a distraction level of the user of the UE 115-*e*, or a combination thereof.

In some cases, the network entity 105-*d* may transmit the alert message based on the positioning information associated with the UE 115-*e* indicating that the UE 115-*e* is within a threshold distance of a roadway. Alternatively, the network entity 105-*d* may transmit the alert message with an indication to adjust one or more traffic signals based on the PSM and a location of the UE 115-*e* with respect to the one or more traffic signals.

Aspects of the process flow 400 may be implemented to realize one or more of the following advantages. The techniques described with reference to FIG. 4 may reduce the probability of VRUs colliding with other users (drivers or pedestrians) in a system that supports V2P communications. For example, if the UE 115-*e* determines that a user of the UE 115-*e* is in a vulnerable state, the UE 115-*e* may indicate the vulnerable state to the network entity 105-*d* such that the network entity 105-*d* can alert the UE 115-*f* In some examples, the network entity 105-*d* may configure or adjust network settings (e.g., traffic lights, crosswalk signals) to further reduce the likelihood of the user colliding with other vehicles or pedestrians. Thus, configuring the UE 115-*e* to transmit a PSM in response to detecting that the user is in a vulnerable state may improve the overall safety of the system.

Figure 5:
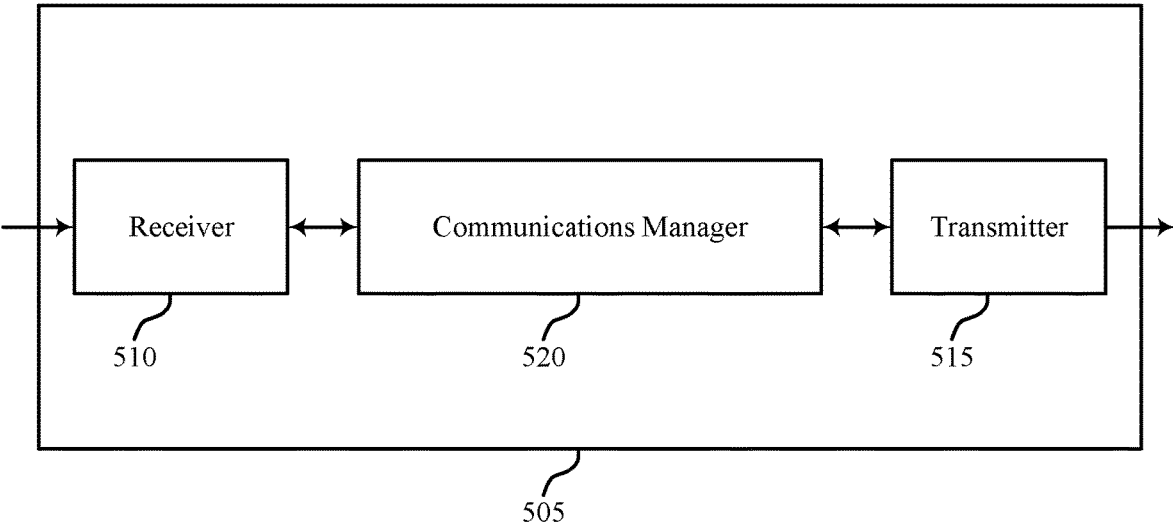
FIGS. 5 and 6 show block diagrams of devices that support techniques for detecting VRUs in accordance with one or more aspects of the present disclosure.
Figure 5:

FIG. 5 shows a block diagram 500 of a device 505 that supports techniques for detecting VRUs in accordance with one or more aspects of the present disclosure. The device 505 may be an example of aspects of a network entity 105, as described herein. The device 505 may include a receiver 510, a transmitter 515, and a communications manager 520. The device 505 may also include a processor. Each of these components may be in communication with one another (e.g., via one or more buses).

The receiver 510 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 505. In some examples, the receiver 510 may support obtaining information by receiving signals via one or more antennas. Additionally, or alternatively, the receiver 510 may support obtaining information by receiving signals via one or more wired (e.g., electrical, fiber optic) interfaces, wireless interfaces, or any combination thereof.

The transmitter 515 may provide a means for outputting (e.g., transmitting, providing, conveying, sending) information generated by other components of the device 505. For example, the transmitter 515 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 515 may support outputting information by transmitting signals via one or more antennas. Additionally, or alternatively, the transmitter 515 may support outputting information by transmitting signals via one or more wired (e.g., electrical, fiber optic) interfaces, wireless interfaces, or any combination thereof. In some examples, the transmitter 515 and the receiver 510 may be co-located in a transceiver, which may include or be coupled with a modem.

The communications manager 520, the receiver 510, the transmitter 515, or various combinations thereof or various components thereof may be examples of means for performing various aspects of techniques for detecting VRUs, as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations, as described herein.

The communications manager 520 may support wireless communication at the device 505 in accordance with examples disclosed herein. For example, the communications manager 520 may be configured as or otherwise support a means for receiving a PSM that indicates a vulnerable state of a user associated with a first UE, where the vulnerable state of the user indicates that the user is in one or more of an inebriated state, a distracted state, an impaired state, or a disabled state. The communications manager 520 may be configured as or otherwise support a means for identifying one or more UEs within a threshold distance of the first UE based on positioning information associated with the first UE and positioning information associated with the one or more UEs. The communications manager 520 may be configured as or otherwise support a means for transmitting an alert message to the one or more UEs within the threshold distance of the first UE, where the alert message includes an indication that the user is in the vulnerable state.

By including or configuring the communications manager 520 in accordance with examples described herein, the device 505 (e.g., a processor controlling or otherwise coupled with the receiver 510, the transmitter 515, the communications manager 520, or a combination thereof)

may reduce the probability of collisions between users (pedestrians or drivers) in a V2P system. For example, if the device 505 determines that a user is in a vulnerable state (based on receiving a PSM), the device 505 may alert other users (drivers or pedestrians) that are within a threshold distance of the user. In some examples, the device 505 may configure or adjust network settings (e.g., traffic lights, crosswalk signals) to further reduce the likelihood of the user colliding with other vehicles or pedestrians. Thus, aspects of the present disclosure may enable the device 505 to identify and alert devices in the vicinity of a VRU, which may improve the overall safety of the V2P system.

Figure 6:

FIG. 6 shows a block diagram 600 of a device 605 that supports techniques for detecting VRUs in accordance with one or more aspects of the present disclosure. The device 605 may be an example of aspects of a device 505 or a network entity 105, as described herein. The device 605 may include a receiver 610, a transmitter 615, and a communications manager 620. The device 605 may also include a processor. Each of these components may be in communication with one another (e.g., via one or more buses).

The receiver 610 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 605. In some examples, the receiver 610 may support obtaining information by receiving signals via one or more antennas. Additionally, or alternatively, the receiver 610 may support obtaining information by receiving signals via one or more wired (e.g., electrical, fiber optic) interfaces, wireless interfaces, or any combination thereof.

The transmitter 615 may provide a means for outputting (e.g., transmitting, providing, conveying, sending) information generated by other components of the device 605. For example, the transmitter 615 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 615 may support outputting information by transmitting signals via one or more antennas. Additionally, or alternatively, the transmitter 615 may support outputting information by transmitting signals via one or more wired (e.g., electrical, fiber optic) interfaces, wireless interfaces, or any combination thereof. In some examples, the transmitter 615 and the receiver 610 may be co-located in a transceiver, which may include or be coupled with a modem.

The device 605, or various components thereof, may be an example of means for performing various aspects of techniques for detecting VRUs, as described herein. For example, the communications manager 620 may include an PSM receiving component 625, a UE identifying component 630, an alert message transmitting component 635, or any combination thereof. The communications manager 620 may be an example of aspects of a communications manager 520, as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations, as described herein.

The communications manager 620 may support wireless communication at the device 605 in accordance with examples disclosed herein. The PSM receiving component 625 may be configured as or otherwise support a means for receiving a PSM that indicates a vulnerable state of a user associated with a first UE, where the vulnerable state of the user indicates that the user is in one or more of an inebriated state, a distracted state, an impaired state, or a disabled state. The UE identifying component 630 may be configured as or otherwise support a means for identifying one or more UEs within a threshold distance of the first UE based on positioning information associated with the first UE and positioning information associated with the one or more UEs. The alert message transmitting component 635 may be configured as or otherwise support a means for transmitting an alert message to the one or more UEs within the threshold distance of the first UE, where the alert message includes an indication that the user is in the vulnerable state.

Figure 7:
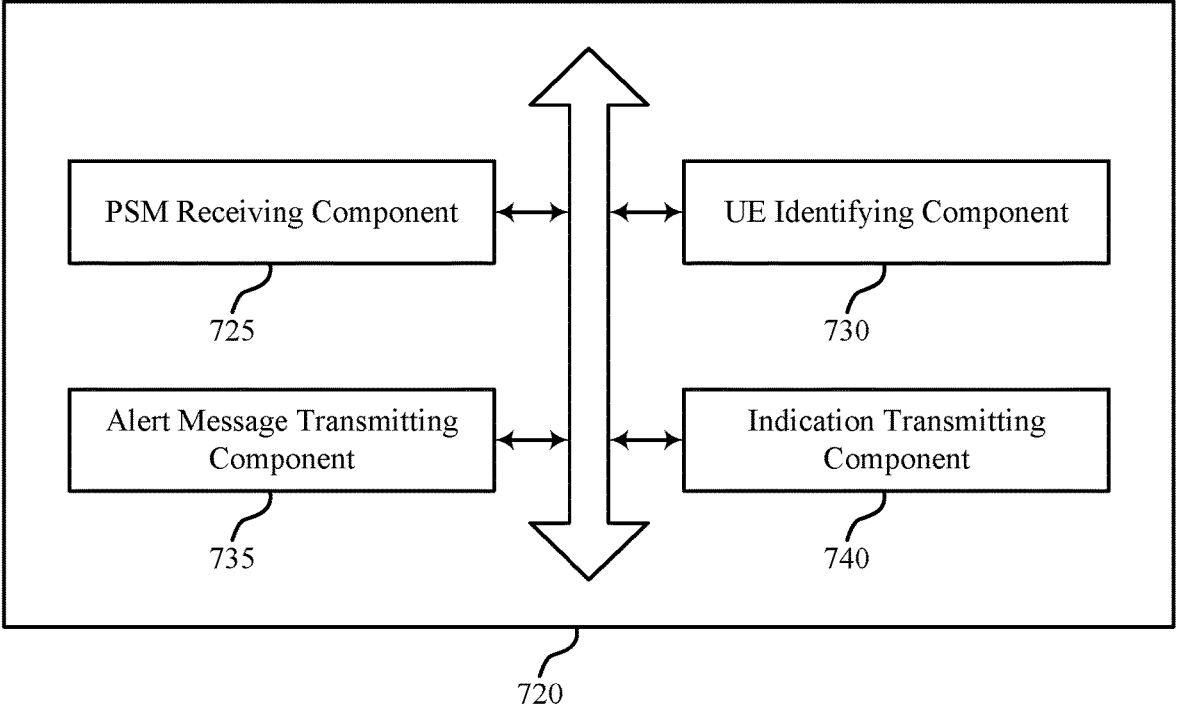
FIG. 7 shows a block diagram of a communications manager that supports techniques for detecting VRUs in accordance with one or more aspects of the present disclosure.

FIG. 7 shows a block diagram 700 of a communications manager 720 that supports techniques for detecting VRUs in accordance with one or more aspects of the present disclosure. The communications manager 720 may be an example of aspects of a communications manager 520, a communications manager 620, or both, as described herein. The communications manager 720, or various components thereof, may be an example of means for performing various aspects of techniques for detecting VRUs, as described herein. For example, the communications manager 720 may include an PSM receiving component 725, a UE identifying component 730, an alert message transmitting component 735, an indication transmitting component 740, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 720 may support wireless communication at a network entity in accordance with examples disclosed herein. The PSM receiving component 725 may be configured as or otherwise support a means for receiving a PSM that indicates a vulnerable state of a user associated with a first UE, where the vulnerable state of the user indicates that the user is in one or more of an inebriated state, a distracted state, an impaired state, or a disabled state. The UE identifying component 730 may be configured as or otherwise support a means for identifying one or more UEs within a threshold distance of the first UE based on positioning information associated with the first UE and positioning information associated with the one or more UEs. The alert message transmitting component 735 may be configured as or otherwise support a means for transmitting an alert message to the one or more UEs within the threshold distance of the first UE, where the alert message includes an indication that the user is in the vulnerable state.

In some examples, to support transmitting the alert message, the alert message transmitting component 735 may be configured as or otherwise support a means for transmitting the alert message that indicates the vulnerable state of the user and one or more of a proximity between the first UE and the one or more UEs, a speed of the first UE, or a likelihood of a collision occurring between the first UE and the one or more UEs.

In some examples, to support transmitting the alert message, the alert message transmitting component 735 may be configured as or otherwise support a means for transmitting the alert message based on the positioning information associated with the first UE indicating that the first UE is within a threshold distance of a roadway.

In some examples, to support transmitting the alert message, the alert message transmitting component 735 may be configured as or otherwise support a means for transmitting the alert message with a priority level that is based on a probability of a collision occurring between the first UE and the one or more UEs.

In some examples, to support transmitting the alert message, the alert message transmitting component 735 may be configured as or otherwise support a means for transmitting the alert message with a priority level that is based on a traffic density associated with a location of the first UE, an environmental factor associated with the location of the first UE, a proximity between the first UE and the one or more UEs, a speed of the first UE, a distraction level of the first UE, or a combination thereof.

In some examples, the indication transmitting component 740 may be configured as or otherwise support a means for transmitting an indication to adjust one or more traffic signals based on the PSM and a location of the first UE with respect to the one or more traffic signals.

In some examples, to support receiving the PSM, the PSM receiving component 725 may be configured as or otherwise support a means for receiving the PSM that indicates the vulnerable state of the user and one or more of a speed of the first UE, a blood alcohol content level of the user, a distraction level of the user, a heart rate of the user, or a geographic location of the UE.

In some examples, to support receiving the PSM, the PSM receiving component 725 may be configured as or otherwise support a means for receiving the PSM that includes a first set of one or more bits indicating the vulnerable state of the user and a second set of one or more bits indicating one or more vulnerable state types of the user, where the alert message indicates the one or more vulnerable state types of the user.

In some examples, to support identifying the one or more UEs, the UE identifying component 730 may be configured as or otherwise support a means for identifying that the one or more UEs are within the threshold distance of the first UE based on a speed of the first UE, a geographic location of the first UE, respective geographic locations of the one or more UEs, a direction of motion associated with the first UE, or a proximity between the first UE and the one or more UEs.

In some examples, the one or more UEs include vehicle UEs in a V2X communications system. In some examples, the first UE is a vehicle UE in a V2X communications system and the one or more UEs are associated with pedestrians within the threshold distance of the vehicle UE.

Figure 8:
FIG. 8 shows a diagram of a system including a device that supports techniques for detecting VRUs in accordance with one or more aspects of the present disclosure.

FIG. 8 shows a diagram of a system 800 including a device 805 that supports techniques for detecting VRUs in accordance with one or more aspects of the present disclosure. The device 805 may be an example of or include the components of a device 505, a device 605, or a network entity 105, as described herein. The device 805 may communicate with one or more network entities 105, one or more UEs 115, or any combination thereof, which may include communications over one or more wired interfaces, over one or more wireless interfaces, or any combination thereof. The device 805 may include components that support outputting and obtaining communications, such as a communications manager 820, a transceiver 810, an antenna 815, a memory 825, code 830, and a processor 835. These components may be in electronic communication or otherwise coupled (e.g., operatively, communicatively, functionally, electronically, electrically) via one or more buses (e.g., a bus 840).

The transceiver 810 may support bi-directional communications via wired links, wireless links, or both, as described herein. In some examples, the transceiver 810 may include a wired transceiver and may communicate bi-directionally with another wired transceiver. Additionally, or alternatively, in some examples, the transceiver 810 may include a wireless transceiver and may communicate bi-directionally with another wireless transceiver. In some examples, the device 805 may include one or more antennas 815, which may be capable of transmitting or receiving wireless transmissions (e.g., concurrently). The transceiver 810 may also include a modem to modulate signals, to provide the modulated signals for transmission (e.g., by one or more antennas 815, by a wired transmitter), to receive modulated signals (e.g., from one or more antennas 815, from a wired receiver), and to demodulate signals. The transceiver 810, or the transceiver 810 and one or more antennas 815 or wired interfaces, where applicable, may be an example of a transmitter 515, a transmitter 615, a receiver 510, a receiver 610, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 825 may include RAM and ROM. The memory 825 may store computer-readable, computer-executable code 830 including instructions that, when executed by the processor 835, cause the device 805 to perform various functions described herein. The code 830 may be stored in a non-transitory computer-readable medium such as system memory or another type of memory. In some cases, the code 830 may not be directly executable by the processor 835 but may cause a computer (e.g., when compiled and executed) to perform functions described herein. In some cases, the memory 825 may contain, among other things, a BIOS which may control basic hardware or software operation such as the interaction with peripheral components or devices.

The processor 835 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 835 may be configured to operate a memory array using a memory controller. In some other cases, a memory controller may be integrated into the processor 835. The processor 835 may be configured to execute computer-readable instructions stored in a memory (e.g., the memory 825) to cause the device 805 to perform various functions (e.g., functions or tasks supporting techniques for detecting VRUs). For example, the device 805 or a component of the device 805 may include a processor 835 and memory 825 coupled with the processor 835, the processor 835 and memory 825 configured to perform various functions described herein. The processor 835 may be an example of a cloud-computing platform (e.g., one or more physical nodes and supporting software such as operating systems, virtual machines, or container instances) that may host the functions (e.g., by executing code 830) to perform the functions of the device 805.

In some examples, a bus 840 may support communications of (e.g., within) a protocol layer of a protocol stack. In some examples, a bus 840 may support communications associated with a logical channel of a protocol stack (e.g., between protocol layers of a protocol stack), which may include communications performed within a component of the device 805, or between different components of the device 805 that may be co-located or located in different locations (e.g., where the device 805 may refer to a system in which one or more of the communications manager 820, the transceiver 810, the memory 825, the code 830, and the processor 835 may be located in one of the different components or divided between different components).

In some examples, the communications manager 820 may manage aspects of communications with a core network 130 (e.g., via one or more wired or wireless backhaul links). For example, the communications manager 820 may manage the transfer of data communications for client devices, such as one or more UEs 115. In some examples, the communications manager 820 may manage communications with other network entities 105, and may include a controller or scheduler for controlling communications with UEs 115 in cooperation with other network entities 105. In some examples, the communications manager 820 may support an X2 interface within an LTE/LTE-A wireless communications network technology to provide communication between network entities 105.

The communications manager 820 may support wireless communication at the device 805 in accordance with examples disclosed herein. For example, the communications manager 820 may be configured as or otherwise support a means for receiving a PSM that indicates a vulnerable state of a user associated with a first UE, where the vulnerable state of the user indicates that the user is in one or more of an inebriated state, a distracted state, an impaired state, or a disabled state. The communications manager 820 may be configured as or otherwise support a means for identifying one or more UEs within a threshold distance of the first UE based on positioning information associated with the first UE and positioning information associated with the one or more UEs. The communications manager 820 may be configured as or otherwise support a means for transmitting an alert message to the one or more UEs within the threshold distance of the first UE, where the alert message includes an indication that the user is in the vulnerable state.

By including or configuring the communications manager 820 in accordance with examples described herein, the device 805 may reduce the probability of collisions between users (pedestrians or drivers) in a V2P system. For example, if the device 805 determines that a user is in a vulnerable state (based on receiving a PSM from a UE), the device 805 may alert other users (drivers or pedestrians) that are within a threshold distance of the user. In some examples, the device 805 may configure or adjust network settings (e.g., traffic lights, crosswalk signals) to further reduce the likelihood of the user colliding with other vehicles or pedestrians. Thus, aspects of the present disclosure may enable the device 805 to identify and alert devices in the vicinity of a VRU, which may improve the overall safety of the V2P system.

In some examples, the communications manager 820 may be configured to perform various operations (e.g., receiving, obtaining, monitoring, outputting, transmitting) using or otherwise in cooperation with the transceiver 810, the one or more antennas 815 (e.g., where applicable), or any combination thereof. Although the communications manager 820 is illustrated as a separate component, in some examples, one or more functions described with reference to the communications manager 820 may be supported by or performed by the processor 835, the memory 825, the code 830, the transceiver 810, or any combination thereof. For example, the code 830 may include instructions executable by the processor 835 to cause the device 805 to perform various aspects of techniques for detecting VRUs, as described herein, or the processor 835 and the memory 825 may be otherwise configured to perform or support such operations.

Figure 9:
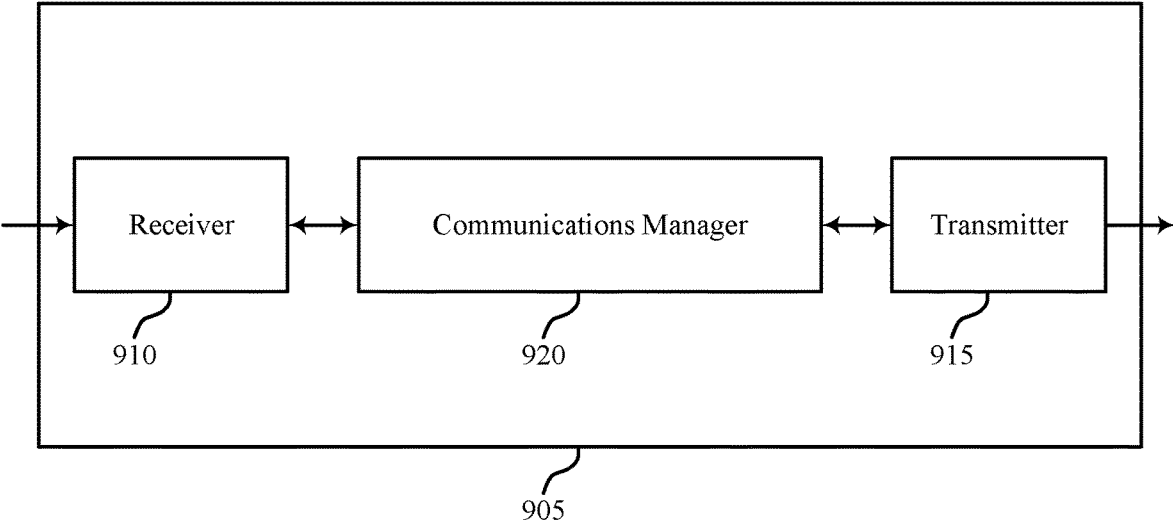
FIGS. 9 and 10 show block diagrams of devices that support techniques for detecting VRUs in accordance with one or more aspects of the present disclosure.

FIG. 9 shows a block diagram 900 of a device 905 that supports techniques for detecting VRUs in accordance with one or more aspects of the present disclosure. The device 905 may be an example of aspects of a UE 115, as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for detecting VRUs). Information may be passed on to other components of the device 905. The receiver 910 may utilize a single antenna or multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for detecting VRUs). In some examples, the transmitter 915 may be co-located with a receiver 910 in a transceiver module. The transmitter 915 may utilize a single antenna or multiple antennas.

The communications manager 920, the receiver 910, the transmitter 915, or various combinations thereof or various components thereof may be examples of means for performing various aspects of techniques for detecting VRUs, as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations, as described herein.

The communications manager 920 may support wireless communication at the device 905 in accordance with examples disclosed herein. For example, the communications manager 920 may be configured as or otherwise support a means for monitoring one or more sensors of the device 905 to obtain data associated with a user of the device 905. The communications manager 920 may be configured as or otherwise support a means for determining that the user is in a vulnerable state based on the data obtained from the one or more sensors, where the vulnerable state indicates that the user is in one or more of an inebriated state, a distracted state, an impaired state, or a disabled state. The communications manager 920 may be configured as or otherwise support a means for transmitting a PSM that indicates the vulnerable state of the user.

By including or configuring the communications manager 920 in accordance with examples described herein, the device 905 (e.g., a processor controlling or otherwise coupled with the receiver 910, the transmitter 915, the communications manager 920, or a combination thereof) may reduce the probability of collisions between a user of the device 905 and other users (pedestrians or drivers) in a V2P system. For example, if the device 905 determines that the user of the device 905 is in a vulnerable state, the device 905 may indicate the vulnerable state to a network entity (e.g., a C2C server) such that the network entity can alert other users in the area. In some examples, the network entity may configure or adjust network settings (e.g., traffic lights, crosswalk signals) to further reduce the likelihood of the user colliding with other vehicles or pedestrians. Thus, configuring the device 905 to detect and report the vulnerable state of the user may improve the overall safety of the V2P system.

Figure 10:

FIG. 10 shows a block diagram 1000 of a device 1005 that supports techniques for detecting VRUs in accordance with one or more aspects of the present disclosure. The device 1005 may be an example of aspects of a device 905 or a UE 115, as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for detecting VRUs). Information may be passed on to other components of the device 1005. The receiver 1010 may utilize a single antenna or multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for detecting VRUs). In some examples, the transmitter 1015 may be co-located with a receiver 1010 in a transceiver module. The transmitter 1015 may utilize a single antenna or multiple antennas.

The device 1005, or various components thereof, may be an example of means for performing various aspects of techniques for detecting VRUs, as described herein. For example, the communications manager 1020 may include a sensor monitoring component 1025, a state determining component 1030, an PSM transmitting component 1035, or any combination thereof. The communications manager 1020 may be an example of aspects of a communications manager 920, as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations, as described herein.

The communications manager 1020 may support wireless communication at the device 1005 in accordance with examples disclosed herein. The sensor monitoring component 1025 may be configured as or otherwise support a means for monitoring one or more sensors of the device 1005 to obtain data associated with a user of the device 1005. The state determining component 1030 may be configured as or otherwise support a means for determining that the user is in a vulnerable state based on the data obtained from the one or more sensors, where the vulnerable state indicates that the user is in one or more of an inebriated state, a distracted state, an impaired state, or a disabled state. The PSM transmitting component 1035 may be configured as or otherwise support a means for transmitting a PSM that indicates the vulnerable state of the user.

Figure 11:
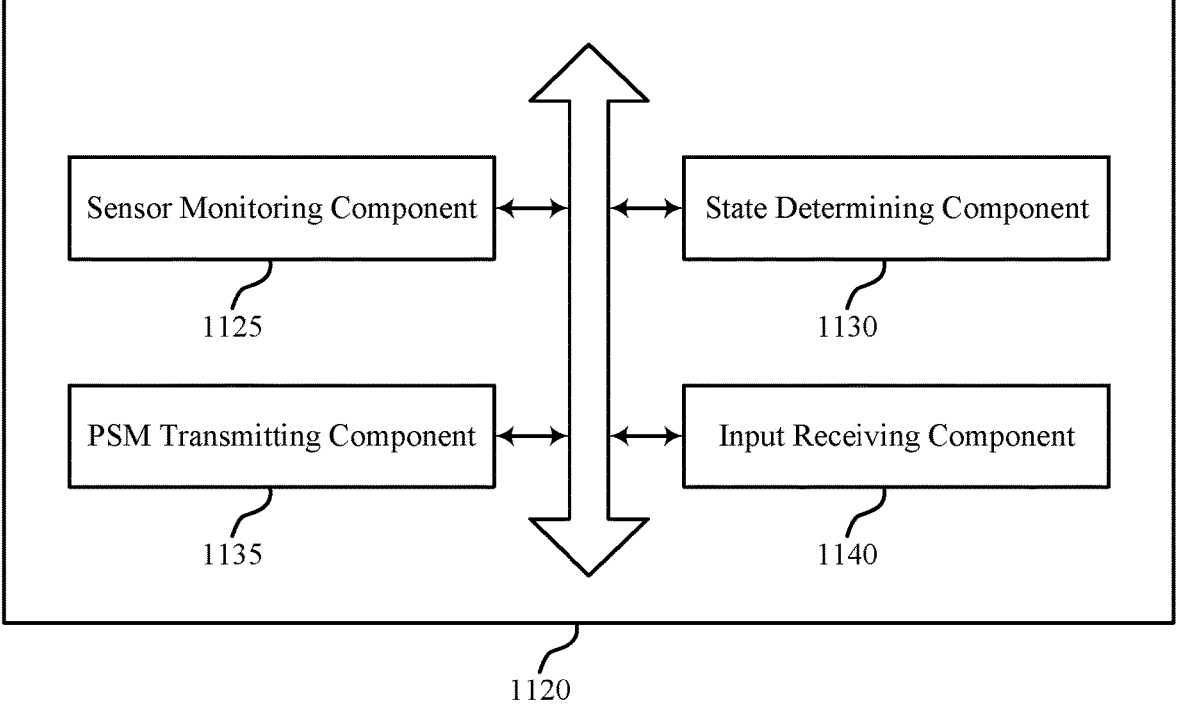
FIG. 11 shows a block diagram of a communications manager that supports techniques for detecting VRUs in accordance with one or more aspects of the present disclosure.

FIG. 11 shows a block diagram 1100 of a communications manager 1120 that supports techniques for detecting VRUs in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of techniques for detecting VRUs, as described herein. For example, the communications manager 1120 may include a sensor monitoring component 1125, a state determining component 1130, an PSM transmitting component 1135, an input receiving component 1140, or any combination thereof. Each of these components may communicate, directly or indirectly, with one another (e.g., via one or more buses).

The communications manager 1120 may support wireless communication at a UE in accordance with examples disclosed herein. The sensor monitoring component 1125 may be configured as or otherwise support a means for monitoring one or more sensors of the UE to obtain data associated with a user of the UE. The state determining component 1130 may be configured as or otherwise support a means for determining that the user is in a vulnerable state based on the data obtained from the one or more sensors, where the vulnerable state indicates that the user is in one or more of an inebriated state, a distracted state, an impaired state, or a disabled state. The PSM transmitting component 1135 may be configured as or otherwise support a means for transmitting a PSM that indicates the vulnerable state of the user.

In some examples, the input receiving component 1140 may be configured as or otherwise support a means for receiving, via a user interface of the UE, a user input indicating that the user is impaired, where determining that the user is in a vulnerable state is based on the user input.

In some examples, to support monitoring the one or more sensors, the sensor monitoring component 1125 may be configured as or otherwise support a means for monitoring one or both of a camera of the UE or a geospatial sensor of the UE to obtain facial recognition data, motion data, positioning data, or a combination thereof, where determining that the user is in the vulnerable state is based on the monitoring.

In some examples, to support transmitting the PSM, the PSM transmitting component 1135 may be configured as or otherwise support a means for transmitting the PSM based on a speed of the UE and a position of the user relative to a camera of the UE.

In some examples, to support monitoring the one or more sensors, the sensor monitoring component 1125 may be configured as or otherwise support a means for monitoring a camera of the UE, a motion sensor of the UE, a blood alcohol sensor associated with the UE, an insulin meter associated with the UE, a wearable device associated with the UE, a blood glucose sensor associated with the UE, a breath analyzer associated with the UE, a pedometer associated with the UE, or a combination thereof.

In some examples, to support determining that the user is in the vulnerable state, the state determining component 1130 may be configured as or otherwise support a means for determining that the user is in the vulnerable state based on using a machine learning model to analyze the data obtained from the one or more sensors.

In some examples, to support transmitting the PSM, the PSM transmitting component 1135 may be configured as or otherwise support a means for transmitting the PSM based on determining that the user is moving within a time duration of a blood alcohol content level of the user exceeding a threshold.

In some examples, to support transmitting the PSM, the PSM transmitting component 1135 may be configured as or otherwise support a means for transmitting the PSM based on a blood alcohol content level of the user and a speed of the UE.

In some examples, to support transmitting the PSM, the PSM transmitting component 1135 may be configured as or otherwise support a means for signaling the vulnerable state of the user via one or more bits corresponding to a perceived state field in the PSM.

In some examples, to support transmitting the PSM, the PSM transmitting component 1135 may be configured as or otherwise support a means for transmitting the PSM that includes a first set of one or more bits indicating the vulnerable state of the user and a second set of one or more bits indicating one or more vulnerable state types of the user.

In some examples, the UE includes a vehicle connected to a V2X communications system. In some examples, the one or more sensors include an accelerometer of the vehicle, a camera associated with the vehicle, a GPS sensor associated with the vehicle, a breath analyzer connected to the vehicle, or a combination thereof.

In some examples, to support transmitting the PSM, the PSM transmitting component 1135 may be configured as or otherwise support a means for transmitting the PSM in response to determining that the user is operating the vehicle while in the vulnerable state.

Figure 12:
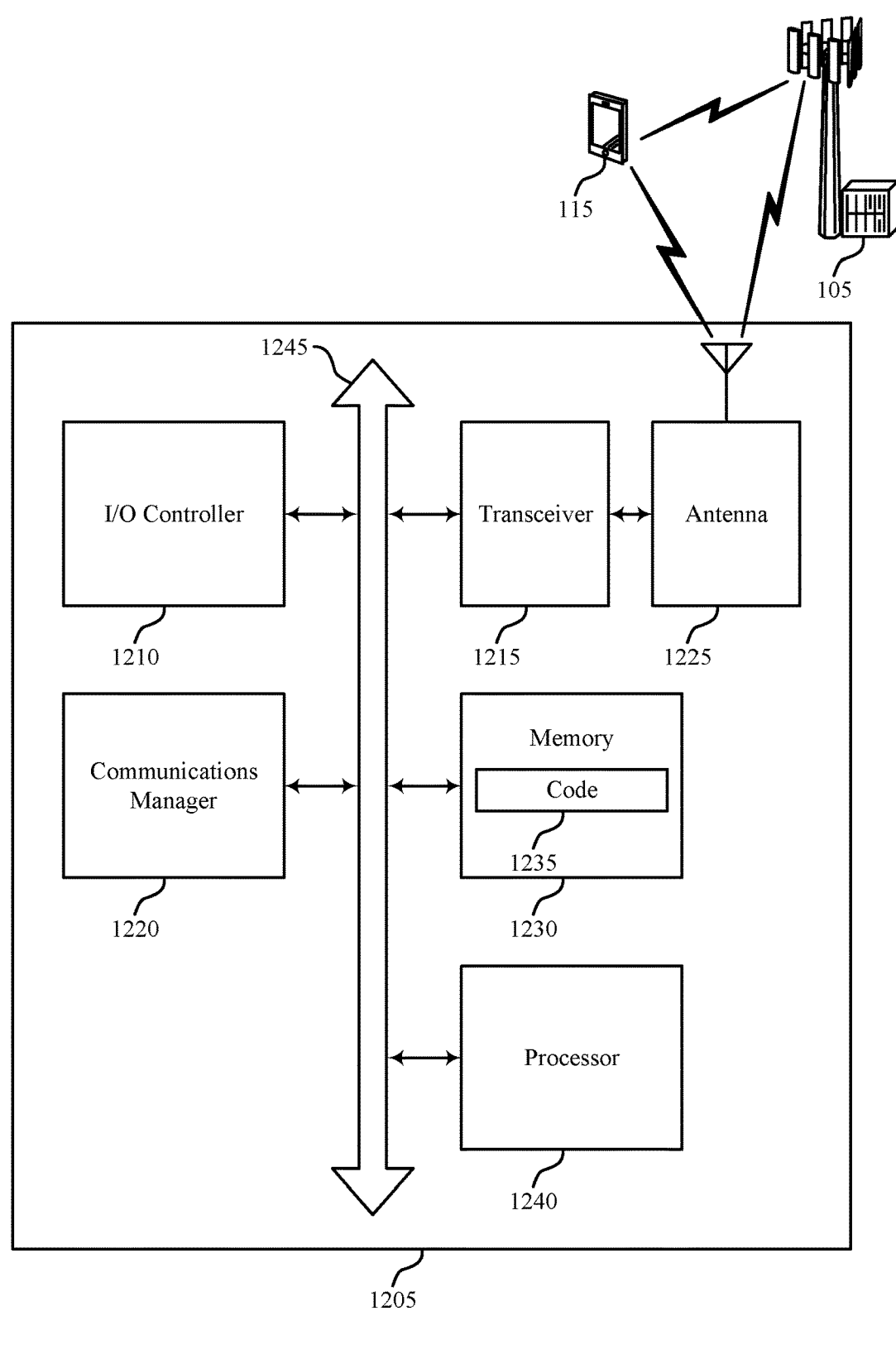
FIG. 12 shows a diagram of a system including a device that supports techniques for detecting VRUs in accordance with one or more aspects of the present disclosure.

FIG. 12 shows a diagram of a system 1200 including a device 1205 that supports techniques for detecting VRUs in accordance with one or more aspects of the present disclosure. The device 1205 may be an example of or include the components of a device 905, a device 1005, or a UE 115, as described herein. The device 1205 may communicate (e.g., wirelessly) with one or more network entities 105, one or more UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, a memory 1230, code 1235, and a processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally or alternatively, the I/O controller 1210 may represent or interact with a modem, a keyboard, a mouse, a touchscreen, or a similar device. In some cases, the I/O controller 1210 may be implemented as part of a processor, such as the processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links, as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include random access memory (RAM) and read-only memory (ROM). The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a basic I/O system (BIOS) which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting techniques for detecting VRUs). For example, the device 1205 or a component of the device 1205 may include a processor 1240 and memory 1230 coupled with or to the processor 1240, the processor 1240 and memory 1230 configured to perform various functions described herein.

The communications manager 1220 may support wireless communication at the device 1205 in accordance with examples disclosed herein. For example, the communications manager 1220 may be configured as or otherwise support a means for monitoring one or more sensors of the device 1205 to obtain data associated with a user of the device 1205. The communications manager 1220 may be configured as or otherwise support a means for determining that the user is in a vulnerable state based on the data obtained from the one or more sensors, where the vulnerable state indicates that the user is in one or more of an inebriated state, a distracted state, an impaired state, or a disabled state. The communications manager 1220 may be configured as or otherwise support a means for transmitting a PSM that indicates the vulnerable state of the user.

By including or configuring the communications manager 1220 in accordance with examples described herein, the device 1205 may reduce the probability of collisions between a user of the device 1205 and other users (pedestrians or drivers) in a V2P system. For example, if the device 1205 determines that the user of the device 1205 is in a vulnerable state, the device 1205 may indicate the vulnerable state to a network entity (e.g., a C2C server) such that the network entity can alert other users in the area. In some examples, the network entity may configure or adjust network settings (e.g., traffic lights, crosswalk signals) to further reduce the likelihood of the user colliding with other vehicles or pedestrians. Thus, configuring the device 1205 to detect and report the vulnerable state of the user may improve the overall safety of the V2P system.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of techniques for detecting VRUs, as described herein, or the processor 1240 and the memory 1230 may be otherwise configured to perform or support such operations.

FIG. 13 shows a flowchart illustrating a method 1300 that supports techniques for detecting VRUs in accordance with one or more aspects of the present disclosure. The operations of the method 1300 may be implemented by a network entity or components of a network entity, as described herein. For example, the operations of the method 1300 may be performed by a network entity 105 described with reference to FIGS. 1 through 8. In some examples, a network entity may execute a set of instructions to control the functional elements of the network entity to perform the described functions. Additionally, or alternatively, the network entity may perform aspects of the described functions using special-purpose hardware.

At 1305, the method may include receiving a PSM that indicates a vulnerable state of a user associated with a first UE, where the vulnerable state of the user indicates that the user is in one or more of an inebriated state, a distracted state, an impaired state, or a disabled state. The operations of 1305 may be performed in accordance with examples disclosed herein. In some examples, aspects of the operations of 1305 may be performed by an PSM receiving component 725, as described with reference to FIG. 7.

At 1310, the method may include identifying one or more UEs within a threshold distance of the first UE based on positioning information associated with the first UE and positioning information associated with the one or more UEs. The operations of 1310 may be performed in accordance with examples disclosed herein. In some examples, aspects of the operations of 1310 may be performed by a UE identifying component 730, as described with reference to FIG. 7.

At 1315, the method may include transmitting an alert message to the one or more UEs within the threshold distance of the first UE, where the alert message includes an indication that the user is in the vulnerable state. The operations of 1315 may be performed in accordance with examples disclosed herein. In some examples, aspects of the operations of 1315 may be performed by an alert message transmitting component 735, as described with reference to FIG. 7.

FIG. 14 shows a flowchart illustrating a method 1400 that supports techniques for detecting VRUs in accordance with one or more aspects of the present disclosure. The operations of the method 1400 may be implemented by a network entity or components of a network entity, as described herein. For example, the operations of the method 1400 may be performed by a network entity 105, as described with reference to FIGS. 1 through 8. In some examples, a network entity may execute a set of instructions to control the functional elements of the network entity to perform the described functions. Additionally, or alternatively, the network entity may perform aspects of the described functions using special-purpose hardware.

At 1405, the method may include receiving a PSM that indicates a vulnerable state of a user associated with a first UE, where the vulnerable state of the user indicates that the user is in one or more of an inebriated state, a distracted state, an impaired state, or a disabled state. The operations of 1405 may be performed in accordance with examples disclosed herein. In some examples, aspects of the operations of 1405 may be performed by an PSM receiving component 725, as described with reference to FIG. 7.

At 1410, the method may include identifying one or more UEs within a threshold distance of the first UE based on positioning information associated with the first UE and positioning information associated with the one or more UEs. The operations of 1410 may be performed in accordance with examples disclosed herein. In some examples, aspects of the operations of 1410 may be performed by a UE identifying component 730, as described with reference to FIG. 7.

At 1415, the method may include transmitting an alert message to the one or more UEs within the threshold distance of the first UE, where the alert message includes an indication that the user is in the vulnerable state. The operations of 1415 may be performed in accordance with examples disclosed herein. In some examples, aspects of the operations of 1415 may be performed by an alert message transmitting component 735, as described with reference to FIG. 7.

At 1420, the method may include transmitting an indication to adjust one or more traffic signals based on the PSM and a location of the first UE with respect to the one or more traffic signals. The operations of 1420 may be performed in accordance with examples disclosed herein. In some examples, aspects of the operations of 1420 may be performed by an indication transmitting component 740, as described with reference to FIG. 7.

FIG. 15 shows a flowchart illustrating a method 1500 that supports techniques for detecting VRUs in accordance with one or more aspects of the present disclosure. The operations of the method 1500 may be implemented by a UE or components of a UE, as described herein. For example, the operations of the method 1500 may be performed by a UE 115, as described with reference to FIGS. 1 through 4 and 9 through 12. In some examples, a UE may execute a set of instructions to control the functional elements of the UE to perform the described functions. Additionally, or alternatively, the UE may perform aspects of the described functions using special-purpose hardware.

At 1505, the method may include monitoring one or more sensors of the UE to obtain data associated with a user of the UE. The operations of 1505 may be performed in accordance with examples disclosed herein. In some examples, aspects of the operations of 1505 may be performed by a sensor monitoring component 1125, as described with reference to FIG. 11.

At 1510, the method may include determining that the user is in a vulnerable state based on the data obtained from the one or more sensors, where the vulnerable state indicates that the user is in one or more of an inebriated state, a distracted state, an impaired state, or a disabled state. The operations of 1510 may be performed in accordance with examples disclosed herein. In some examples, aspects of the operations of 1510 may be performed by a state determining component 1130, as described with reference to FIG. 11.

At 1515, the method may include transmitting a PSM that indicates the vulnerable state of the user. The operations of 1515 may be performed in accordance with examples disclosed herein. In some examples, aspects of the operations of 1515 may be performed by an PSM transmitting component 1135, as described with reference to FIG. 11.

FIG. 16 shows a flowchart illustrating a method 1600 that supports techniques for detecting VRUs in accordance with one or more aspects of the present disclosure. The operations of the method 1600 may be implemented by a UE or components of a UE, as described herein. For example, the operations of the method 1600 may be performed by a UE 115, as described with reference to FIGS. 1 through 4 and 9 through 12. In some examples, a UE may execute a set of instructions to control the functional elements of the UE to perform the described functions. Additionally, or alternatively, the UE may perform aspects of the described functions using special-purpose hardware.

At 1605, the method may include monitoring one or more sensors of the UE to obtain data associated with a user of the UE. The operations of 1605 may be performed in accordance with examples disclosed herein. In some examples, aspects of the operations of 1605 may be performed by a sensor monitoring component 1125, as described with reference to FIG. 11.

At 1610, the method may include receiving, via a user interface of the UE, a user input indicating that the user is impaired. The operations of 1610 may be performed in accordance with examples disclosed herein. In some examples, aspects of the operations of 1610 may be performed by an input receiving component 1140, as described with reference to FIG. 11.

At 1615, the method may include determining that the user is in a vulnerable state based on the user input and the data obtained from the one or more sensors, where the vulnerable state indicates that the user is in one or more of an inebriated state, a distracted state, an impaired state, or a disabled state. The operations of 1615 may be performed in accordance with examples disclosed herein. In some examples, aspects of the operations of 1615 may be performed by a state determining component 1130, as described with reference to FIG. 11.

At 1620, the method may include transmitting a PSM that indicates the vulnerable state of the user. The operations of 1620 may be performed in accordance with examples disclosed herein. In some examples, aspects of the operations of 1620 may be performed by an PSM transmitting component 1135, as described with reference to FIG. 11.

The following provides an overview of aspects of the present disclosure:

Aspect 1: A method for wireless communication at a network entity, comprising: receiving a public safety message that indicates a vulnerable state of a user associated with a first UE, wherein the vulnerable state of the user indicates that the user is in one or more of an inebriated state, a distracted state, an impaired state, or a disabled state; identifying one or more UEs within a threshold distance of the first UE based at least in part on positioning information associated with the first UE and positioning information associated with the one or more UEs; and transmitting an alert message to the one or more UEs within the threshold distance of the first UE, wherein the alert message comprises an indication that the user is in the vulnerable state.

Aspect 2: The method of aspect 1, wherein transmitting the alert message comprises: transmitting the alert message that indicates the vulnerable state of the user and one or more of a proximity between the first UE and the one or more UEs, a speed of the first UE, or a likelihood of a collision occurring between the first UE and the one or more UEs.

Aspect 3: The method of any of aspects 1 through 2, wherein transmitting the alert message comprises: transmitting the alert message based at least in part on the positioning information associated with the first UE indicating that the first UE is within a threshold distance of a roadway.

Aspect 4: The method of any of aspects 1 through 3, wherein transmitting the alert message comprises: transmitting the alert message with a priority level that is based at least in part on to a probability of a collision occurring between the first UE and the one or more UEs.

Aspect 5: The method of any of aspects 1 through 4, wherein transmitting the alert message comprises: transmitting the alert message with a priority level that is based at least in part on a traffic density associated with a location of the first UE, an environmental factor associated with the location of the first UE, a proximity between the first UE and the one or more UEs, a speed of the first UE, a distraction level of the first UE, or a combination thereof.

Aspect 6: The method of any of aspects 1 through 5, further comprising: transmitting an indication to adjust one or more traffic signals based at least in part on the public safety message and a location of the first UE with respect to the one or more traffic signals.

Aspect 7: The method of any of aspects 1 through 6, wherein receiving the public safety message comprises: receiving the public safety message that indicates the vulnerable state of the user and one or more of a speed of the first UE, a blood alcohol content level of the user, a distraction level of the user, a heart rate of the user, or a geographic location of the UE.

Aspect 8: The method of any of aspects 1 through 7, wherein receiving the public safety message comprises: receiving the public safety message that comprises a first set of one or more bits indicating the vulnerable state of the user and a second set of one or more bits indicating one or more vulnerable state types of the user, wherein the alert message indicates the one or more vulnerable state types of the user.

Aspect 9: The method of any of aspects 1 through 8, wherein identifying the one or more UEs comprises: identifying that the one or more UEs are within the threshold distance of the first UE based at least in part on a speed of the first UE, a geographic location of the first UE, respective geographic locations of the one or more UEs, a direction of motion associated with the first UE, or a proximity between the first UE and the one or more UEs.

Aspect 10: The method of any of aspects 1 through 9, wherein the one or more UEs comprise vehicle UEs in a vehicle-to-everything (V2X) communications system.

Aspect 11: The method of any of aspects 1 through 9, wherein the first UE is a vehicle UE in a vehicle-to-everything (V2X) communications system and the one or more UEs are associated with pedestrians within the threshold distance of the vehicle UE.

Aspect 12: A method for wireless communication at a UE, comprising: monitoring one or more sensors of the UE to obtain data associated with a user of the UE; determining that the user is in a vulnerable state based at least in part on the data obtained from the one or more sensors, wherein the vulnerable state indicates that the user is in one or more of an inebriated state, a distracted state, an impaired state, or a disabled state; and transmitting a public safety message that indicates the vulnerable state of the user.

Aspect 13: The method of aspect 12, further comprising: receiving, via a user interface of the UE, a user input indicating that the user is impaired, wherein determining that the user is in a vulnerable state is based at least in part on the user input.

Aspect 14: The method of any of aspects 12 through 13, wherein monitoring the one or more sensors comprises: monitoring one or both of a camera of the UE or a geospatial sensor of the UE to obtain facial recognition data, motion data, positioning data, or a combination thereof, wherein determining that the user is in the vulnerable state is based at least in part on the monitoring.

Aspect 15: The method of any of aspects 12 through 14, wherein transmitting the public safety message comprises: transmitting the public safety message based at least in part on a speed of the UE and a position of the user relative to a camera of the UE.

Aspect 16: The method of any of aspects 12 through 15, wherein monitoring the one or more sensors comprises: monitoring a camera of the UE, a motion sensor of the UE, a blood alcohol sensor associated with the UE, an insulin meter associated with the UE, a wearable device associated with the UE, a blood glucose sensor associated with the UE, a breath analyzer associated with the UE, a pedometer associated with the UE, or a combination thereof.

Aspect 17: The method of any of aspects 12 through 16, wherein determining that the user is in the vulnerable state comprises: determining that the user is in the vulnerable state based at least in part on using a machine learning model to analyze the data obtained from the one or more sensors.

Aspect 18: The method of any of aspects 12 through 17, wherein transmitting the public safety message comprises: transmitting the public safety message based at least in part on determining that the user is moving within a time duration of a blood alcohol content level of the user exceeding a threshold.

Aspect 19: The method of any of aspects 12 through 18, wherein transmitting the public safety message comprises: transmitting the public safety message based at least in part on a blood alcohol content level of the user and a speed of the UE.

Aspect 20: The method of any of aspects 12 through 19, wherein transmitting the public safety message comprises: signaling the vulnerable state of the user via one or more bits corresponding to a perceived state field in the public safety message.

Aspect 21: The method of any of aspects 12 through 20, wherein transmitting the public safety message comprises: transmitting the public safety message that comprises a first set of one or more bits indicating the vulnerable state of the user and a second set of one or more bits indicating one or more vulnerable state types of the user.

Aspect 22: The method of any of aspects 12 through 21, wherein the UE comprises a vehicle connected to a vehicle-to-everything (V2X) communications system; and the one or more sensors comprise an accelerometer of the vehicle, a camera associated with the vehicle, a GPS sensor associated with the vehicle, a breath analyzer connected to the vehicle, or a combination thereof.

Aspect 23: The method of aspect 22, wherein transmitting the public safety message comprises: transmitting the public safety message in response to determining that the user is operating the vehicle while in the vulnerable state.

Aspect 24: An apparatus for wireless communication at a network entity, comprising: a processor; memory coupled with the processor; and instructions stored in the memory and executable by the processor to cause the apparatus to perform a method of any of aspects 1 through 11.

Aspect 25: An apparatus for wireless communication at a network entity, comprising: at least one means for performing a method of any of aspects 1 through 11.

Aspect 26: A non-transitory computer-readable medium storing code for wireless communication at a network entity, the code comprising instructions executable by a processor to perform a method of any of aspects 1 through 11.

Aspect 27: An apparatus for wireless communication at a UE, comprising: a processor; memory coupled with the processor; and instructions stored in the memory and executable by the processor to cause the apparatus to perform a method of any of aspects 12 through 23.

Aspect 28: An apparatus for wireless communication at a UE, comprising: at least one means for performing a method of any of aspects 12 through 23.

Aspect 29: A non-transitory computer-readable medium storing code for wireless communication at a UE, the code comprising instructions executable by a processor to perform a method of any of aspects 12 through 23.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a network entity, comprising:
   at least one processor;
   at least one physical memory coupled with the at least one processor; and
   instructions stored in the at least one physical memory and executable by the at least one processor to cause the apparatus to:
      receive, at the network entity from a first user equipment (UE) via uplink communications, a public safety message that comprises a first set of one or more bits indicating a vulnerable state of a user associated with the first UE, wherein the vulnerable state of the user indicates that the user is in one or more of an inebriated state, a distracted state, an impaired state, or a disabled state;
      identify one or more UEs within a threshold distance of the first UE based at least in part on positioning information associated with the first UE and positioning information associated with the one or more UEs; and
      transmit, from the network entity to the one or more UEs via downlink communications, an alert message to the one or more UEs within the threshold distance of the first UE, wherein the alert message comprises an indication that the user is in the vulnerable state.

2. The apparatus of claim 1, wherein the instructions to transmit the alert message are executable by the at least one processor to cause the apparatus to:
   transmit the alert message that indicates the vulnerable state of the user and one or more of a proximity between the first UE and the one or more UEs, a speed of the first UE, or a likelihood of a collision occurring between the first UE and the one or more UEs.

3. The apparatus of claim 1, wherein the instructions to transmit the alert message are executable by the at least one processor to cause the apparatus to:
   transmit the alert message based at least in part on the positioning information associated with the first UE indicating that the first UE is within a threshold distance of a roadway.

4. The apparatus of claim 1, wherein the instructions to transmit the alert message are executable by the at least one processor to cause the apparatus to:
   transmit the alert message with a priority level that is based at least in part on a probability of a collision occurring between the first UE and the one or more UEs.

5. The apparatus of claim 1, wherein the instructions to transmit the alert message are executable by the at least one processor to cause the apparatus to:
   transmit the alert message with a priority level that is based at least in part on a traffic density associated with a location of the first UE, an environmental factor associated with the location of the first UE, a proximity between the first UE and the one or more UEs, a speed of the first UE, a distraction level of the first UE, or a combination thereof.

6. The apparatus of claim 1, wherein the instructions are further executable by the at least one processor to cause the apparatus to:
   transmit an indication to adjust one or more traffic signals based at least in part on the public safety message and a location of the first UE with respect to the one or more traffic signals.

7. The apparatus of claim 1, wherein the instructions to receive the public safety message are executable by the at least one processor to cause the apparatus to:
   receive the public safety message that indicates the vulnerable state of the user and one or more of a speed of the first UE, a blood alcohol content level of the user, a distraction level of the user, a heart rate of the user, or a geographic location of the UE.

8. The apparatus of claim 1, wherein
   the public safety message further comprises a second set of one or more bits indicating one or more vulnerable state types of the user, wherein the one or more vulnerable state types of the user comprise the inebriated state, the distracted state, the impaired state, and the disabled state, and wherein the alert message indicates the one or more vulnerable state types of the user.

9. The apparatus of claim 1, wherein the instructions to identify the one or more UEs are executable by the at least one processor to cause the apparatus to:
   identify that the one or more UEs are within the threshold distance of the first UE based at least in part on a speed of the first UE, a geographic location of the first UE, respective geographic locations of the one or more UEs, a direction of motion associated with the first UE, or a proximity between the first UE and the one or more UEs.

10. The apparatus of claim 1, wherein the one or more UEs comprise vehicle UEs in a vehicle-to-everything (V2X) communications system.

11. The apparatus of claim 1, wherein the first UE is a vehicle UE in a vehicle-to-everything (V2X) communications system and the one or more UEs are associated with pedestrians within the threshold distance of the vehicle UE.

12. An apparatus for wireless communication at a user equipment (UE), comprising:
   at least one processor;
   at least one physical memory coupled with the at least one processor; and
   instructions stored in the at least one physical memory and executable by the at least one processor to cause the apparatus to:
      monitor one or more sensors of the UE to obtain data associated with a user of the UE;
      determine that the user is in a vulnerable state based at least in part on the data obtained from the one or more sensors; and
      transmit, from the UE to a network entity via uplink communications and in response to determining that the user is operating a vehicle while in the vulnerable state, a public safety message that comprises a first set of one or more bits indicating that the user is in the vulnerable state and comprises a second set of one or more bits indicating one or more vulnerable state types of the user, the one or more vulnerable state types of the user comprising one or more of an inebriated state, a distracted state, an impaired state, or a disabled state.

13. The apparatus of claim 12, wherein the instructions are further executable by the at least one processor to cause the apparatus to:
receive, via a user interface of the UE, a user input indicating that the user is impaired, wherein determining that the user is in the vulnerable state is based at least in part on the user input.

14. The apparatus of claim 12, wherein the instructions to monitor the one or more sensors are executable by the at least one processor to cause the apparatus to:
monitor one or both of a camera of the UE or a geospatial sensor of the UE to obtain facial recognition data, motion data, positioning data, or a combination thereof, wherein determining that the user is in the vulnerable state is based at least in part on the monitoring.

15. The apparatus of claim 12, wherein the instructions to transmit the public safety message are executable by the at least one processor to cause the apparatus to:
transmit the public safety message based at least in part on a speed of the UE and a position of the user relative to a camera of the UE.

16. The apparatus of claim 12, wherein the instructions to monitor the one or more sensors are executable by the at least one processor to cause the apparatus to:
monitor a camera of the UE, a motion sensor of the UE, a blood alcohol sensor associated with the UE, an insulin meter associated with the UE, a wearable device associated with the UE, a blood glucose sensor associated with the UE, a breath analyzer associated with the UE, a pedometer associated with the UE, or a combination thereof.

17. The apparatus of claim 12, wherein the instructions to determine that the user is in the vulnerable state are executable by the at least one processor to cause the apparatus to:
determine that the user is in the vulnerable state based at least in part on using a machine learning model to analyze the data obtained from the one or more sensors.

18. The apparatus of claim 12, wherein the instructions to transmit the public safety message are executable by the at least one processor to cause the apparatus to:
transmit the public safety message based at least in part on determining that the user is moving within a time duration of a blood alcohol content level of the user exceeding a threshold.

19. The apparatus of claim 12, wherein the instructions to transmit the public safety message are executable by the at least one processor to cause the apparatus to:
transmit the public safety message based at least in part on a blood alcohol content level of the user and a speed of the UE.

20. The apparatus of claim 12, wherein:
the UE comprises the vehicle connected to a vehicle-to-everything (V2X) communications system; and
the one or more sensors comprise an accelerometer of the vehicle, a camera associated with the vehicle, a global positioning system (GPS) sensor associated with the vehicle, a breath analyzer connected to the vehicle, or a combination thereof.

21. A method for wireless communication at a network entity, comprising:
receiving, at the network entity from a first user equipment (UE) via uplink communications, a public safety message that comprises a first set of one or more bits indicating a vulnerable state of a user associated with the first UE, wherein the vulnerable state of the user indicates that the user is in one or more of an inebriated state, a distracted state, an impaired state, or a disabled state;
identifying one or more UEs within a threshold distance of the first UE based at least in part on positioning information associated with the first UE and positioning information associated with the one or more UEs; and
transmitting, from the network entity to the one or more UEs via downlink communications, an alert message to the one or more UEs within the threshold distance of the first UE, wherein the alert message comprises an indication that the user is in the vulnerable state.

22. The method of claim 21, wherein transmitting the alert message comprises:
transmitting the alert message that indicates the vulnerable state of the user and one or more of a proximity between the first UE and the one or more UEs, a speed of the first UE, or a likelihood of a collision occurring between the first UE and the one or more UEs.

23. The method of claim 21, wherein transmitting the alert message comprises:
transmitting the alert message based at least in part on the positioning information associated with the first UE indicating that the first UE is within a threshold distance of a roadway.

24. The method of claim 21, wherein transmitting the alert message comprises:
transmitting the alert message with a priority level that is based at least in part on a probability of a collision occurring between the first UE and the one or more UEs.

25. A method for wireless communication at a user equipment (UE), comprising:
monitoring one or more sensors of the UE to obtain data associated with a user of the UE;
determining that the user is in a vulnerable state based at least in part on the data obtained from the one or more sensors; and
transmitting, from the UE to a network entity via uplink communications and in response to determining that the user is operating a vehicle while in the vulnerable state, a public safety message that comprises a first set of one or more bits indicating that the user is in the vulnerable state and comprises a second set of one or more bits indicating one or more vulnerable state types of the user, the one or more vulnerable state types of the user comprising one or more of an inebriated state, a distracted state, an impaired state, or a disabled state.

26. The method of claim 25, further comprising:
receiving, via a user interface of the UE, a user input indicating that the user is impaired, wherein determining that the user is in the vulnerable state is based at least in part on the user input.

27. The method of claim 25, wherein monitoring the one or more sensors comprises:
monitoring one or both of a camera of the UE or a geospatial sensor of the UE to obtain facial recognition data, motion data, positioning data, or a combination thereof, wherein determining that the user is in the vulnerable state is based at least in part on the monitoring.

* * * * *